（12) United States Patent
Zavadsky et al.

(10) Patent No.: US 8,287,434 B2
(45) Date of Patent: Oct. 16, 2012

(54) METHOD AND APPARATUS FOR FACILITATING STRENGTH TRAINING

(76) Inventors: Vyacheslav Zavadsky, Ottawa (CA); Mykola Sherstyuk, Ottawa (CA)

( * ) Notice: Subject to any disclaimer, the term of this patent is extended or adjusted under 35 U.S.C. 154(b) by 0 days.

(21) Appl. No.: 13/111,869

(22) Filed: May 19, 2011

(65) Prior Publication Data

US 2011/0251021 A1    Oct. 13, 2011

Related U.S. Application Data

(63) Continuation-in-part of application No. 12/618,680, filed on Nov. 13, 2009, now Pat. No. 7,967,728.

(60) Provisional application No. 61/346,865, filed on May 20, 2010, provisional application No. 61/115,082, filed on Nov. 16, 2008.

(51) Int. Cl.
*A63B 71/00* (2006.01)

(52) U.S. Cl. ............ 482/5; 482/1; 482/8; 482/901

(58) Field of Classification Search .......... 482/1–9, 482/51, 54, 57, 900–902; 434/247
See application file for complete search history.

(56) References Cited

U.S. PATENT DOCUMENTS

| | | | |
|---|---|---|---|
| 4,556,216 A | 12/1985 | Pitkanen | |
| 5,054,771 A | 10/1991 | Mansfield | |
| 5,149,084 A | 9/1992 | Dalebout | |
| 5,839,990 A | 11/1998 | Virkkala | |
| 5,888,172 A * | 3/1999 | Andrus et al. | 482/7 |
| 6,244,988 B1 | 6/2001 | Delman | |
| 6,447,424 B1 | 9/2002 | Ashby | |
| 6,872,187 B1 | 3/2005 | Stark | |
| 6,997,853 B1 * | 2/2006 | Cuskaden et al. | 482/8 |
| 7,156,780 B1 | 1/2007 | Fuchs | |
| 7,537,546 B2 | 5/2009 | Watterson | |
| 7,628,730 B1 | 12/2009 | Watterson | |
| 7,637,847 B1 | 12/2009 | Hickman | |
| 7,699,755 B2 | 4/2010 | Feldman | |
| 7,727,117 B2 | 6/2010 | Feldman | |
| 8,012,064 B2 | 9/2011 | Martens | |
| 8,057,360 B2 * | 11/2011 | Shea | 482/8 |
| 2003/0171190 A1 * | 9/2003 | Rice | 482/57 |
| 2003/0211916 A1 | 11/2003 | Capuano | |
| 2009/0325766 A1 * | 12/2009 | Kasama et al. | 482/8 |
| 2010/0197462 A1 | 8/2010 | Piane, Jr. | |

OTHER PUBLICATIONS http://glovepie.org/glovepie.php Glovepie, programmable input emulator. Web page printed on May 18, 2010.

(Continued)

*Primary Examiner* — Glenn Richman

(57) ABSTRACT

Strength training exercise is facilitated by a video gaming system (VGS). VGS communicates information about the exercise resistance force with an exercise device. Strength training machine coupled with the VGS and acts as a game controller. The machine provides resistance by an electrical motor. Resistance can be adjusted using data send from the VGS. Further, the resistance can pulsate during an exercise motion, providing internal muscle massage. The video gaming system uses a non-contact method to monitor a physiological parameter of the user. For example, a video camera is used to detect heart rate. Pose tracking information is used to detect the level of user exhaustion. Those and other monitored parameters are used to adjust the regime for either current or future exercises. The regime is optimized to increase workout efficiency. An activity not directly related to exercise, for example game, is unlocked if exercise performance is on track.

20 Claims, 52 Drawing Sheets

OTHER PUBLICATIONS http://service.nordictrack.com/CustomerService/pdfDownload.do?fileName=NTSY9896.0-248458.pdf&directory=%2fpdf%2f NordictTrackPersonal Trainer III User manual. Downloaded and printed May 25, 2010.

http://www.hcc.cz/article/powerman-3 Web Page printed on May 25, 2010. Koelber powerman 3.

http://www.newbody.de/koelbel/isokinator/isokinator_pro_typ1.php4 Web page printed on May 25, 2010. Kolebel Isokinator pro.

d2 Square products description, http://www.d2tech.net/products.shtml.

Contact-Free Measurement of Cardiac Pulse Based on the Analysis of Thermal Imagery1 M. Garbey2, N. Sun2, A. Merla3, and I. Pavlidis2 Technical Report No. UH-CS-04-08 Dec. 14, 2004 See Abstract.

* cited by examiner

METHOD AND APPARATUS FOR FACILITATING STRENGTH TRAINING

CLAIM OF PRIORITY

This application is a continuation in part of U.S. Utility application Ser. No. 12/618,680 filed Nov. 13, 2009 that claims priority under 35 USC Section 119(a) from U.S. Provisional Application No. 61/115,082, filed Nov. 16, 2008.

This application further claims priority under 35 USC Section 119(a) from U.S. Provisional Application No. 61/346,865, filed May 20, 2010.

All the above mentioned applications are hereby incorporated by reference in their entirety.

BACKGROUND OF THE INVENTION

Recently, a number of exercise and fitness computer and video games emerged. Wii Fit and related games uses Nintendo Wii video gaming system and Wii Balance board peripheral. The exemplary games include Electronics Arts Sports Active 2, The biggest loser challenge, Active Life Explorer, Just Dance 2, Wii Fit Plus, Walk It out, Zumba Fitness, NFL training camp, etc. A number of games uses Microsoft Kinect peripheral for XBOX 360 video gaming system. Microsoft Kinect uses a video camera to track player pose and enable interaction with the player. Examples of game titles for Microsoft Kinect include Your Shape Fitness Evolved, Zumba Fitness, The biggest loser challenge Ultimate, Electronics Arts Sports Active, etc. A growing number of video games relies on smartphones and tablets as a video gaming system. Examples include Walk n'Play, Wellness Workout, Runkeeper Pro, etc. Some game, such as YourSelf fitness use home computer as a video gaming system.

The video games mentioned above direct user through various aerobic and strength training exercises and incorporate the exercises into various fun activities.

Strength training and aerobic exercises are two distinct kind of exercises with distinct training machines and techniques. Aerobic training involves long-term repetitive use of non-specific large muscle groups aiming at targeting cardiac and pulmonary systems. In contrast, strength training (strengthening) involves generation of a contraction of a specific muscle(s) for a number of repetitions and sets to quickly exhaust the muscle(s) aiming at increasing strength of the muscle(s).

Efficient strengthening requires manipulation of resistance and exercise regime. Some of the exercise, such as pull ups, push ups, squats, etc use just body weight to provide resistance force. However, most of efficient exercise regimes require use of resistance devices, such as dumbbells, resistance bands, isometric exercise devices, strength training machines, and so on.

Existing exercise video games provide a lot of capabilities to enable aerobics exercises. Most of the games enable strength training where body mass is used as resistance. Some of the games encourages uses of a limited number of resistance devices (free weights, resistance bands). However, those games are not aware of the level of resistance provided nor can control it, that prevents from engaging in an efficient strength training exercise regime.

None of the existing games on the market provides balance between exercise and entertaining activities. User may become focused on entertaining activity or specific exercise at the expense of balanced and efficient exercise regime.

Various types of exercise equipment have been developed for muscle building and toning, whether ultimately used as a sport or for physical therapy.

Resistance exercise machines use various sources of resistance (gravity, friction, hydraulics, etc), and a combination of simple machines to convey that resistance to the person using the machine. Each of the simple machines (pulley, lever, wheel, incline) changes the mechanical advantage of the overall machine. Most exercise machines incorporate an Ergo-meter. An Ergo-meter is an apparatus for measuring the work a person exerts while exercising as used in training or medical tests.

Endless-path machines: Running/Walking machines (treadmills), elliptical, glider, climbing machines and stationary bicycles. The treadmill is one of the most popular endless-pass machines. It provides a moving platform with a wide Conveyor belt and an electric motor or a flywheel.

Rowing machines, also named rowers, simulate the body movements of using a rowing boat.

Spine Exercisers: range of fitness machines which comprises two foot striding units and two hand striding units, the Spine Exercisers concentrate on exercising and strengthening the muscles of the spinal column and vertebrae joints with the spine in free horizontal position.

Spinning ropes, boxing gloves, punching bags for kickboxing and Mixed Martial Arts.

Wii Fit,—an exercise game consisting of activities using the Wii Balance Board peripheral. Training on Wii Fit is divided into four categories: yoga, strength training, aerobics, and balance games. The activities provide a core workout, emphasizing controlled movements rather than overexertion Nautilus® Nitro style equipment: During any exercise, an individuals' strength varies at different points. Other machines don't address this strength curve—instead, the weight remains constant from beginning to end. This can limit muscle recruitment and overall performance. This system is driven by a four-bar linkage system, cam design, or a combination of both, which enables matching of the body's potential increases and decreases in strength.

One of the more common types of exercise equipment is the weight type device which uses weights to provide the necessary resistance. As is well known, these weight type devices have several disadvantages. They are cumbersome to move since they are generally associated with a frame and bench assembly and the weights need to be moved when the equipment is moved. In addition, these devices may cause injury to an inexperienced user since the weights may be dropped suddenly. Further, when weights are lifted an inertia of movement is created which tends to provide unevenness in the operating resistance during the exercising process.

An issue with those machines is that the velocity at which the weight is moved is controlled by the user. Many, if not most, users will move the weight at a velocity which is too fast for optimum muscle development.

Another problem is that the weight which is lowered is the same as the weight which is lifted, even though the muscles are capable of controlled lowering of a larger weight than they can lift. This controlled lowering of a weight, or negative resistance, is the most beneficial exercise for developing strength.

It is also desirable to perform a number of repetitions of each exercise, such as eight to twelve, so as to fatigue the muscle(s) being exercised. Because the capability of the muscles to perform the exercise decreases with each repetition, a weight which is less than the maximum which can be lifted is usually selected for the exercise. A preferred form is to have the weight for each repetition to be the maximum for that repetition; i.e. the weight should change with each repetition.

The therapeutic exercise is the prescription of bodily movement to correct an impairment, improve musculoskeletal function, or maintain a state of well-being. It may vary from highly selected activities restricted to specific muscles or parts of the body, to general and vigorous activities that can return a convalescing patient to the peak of physical condition.

Therapeutic exercise seeks to accomplish the following goals
- Correct abnormal movement patterns and co-contractions;
- Facilitate movement of limbs in prescribed range
- Allow prescribed resistance to be used during each specific exercise. Release contracted muscles, tendons, and fascia;
- Improve coordination;
- Reduce rigidity
- Improve balance
- Promote relaxation
- Improve muscle strength and, if possible, achieve and maintain maximal voluntary contractile force (MVC)
- Improve exercise performance and functional capacity (endurance)

There is considerable effort to couple exercise devices with various video gaming systems. The shining example of commercial success in this direction is Nintendo's WII fit, which uses balance board and a simple remote controller to drive interactive games and virtual personal training. The success of WII fit is based on the facts that (a) is a gadget (small, non-expensive) (b) it is easy to use (c) it is coupled with highly interactive and entertaining gaming activity. However, WII Fit does not provide resistance. The resistance exercises are limited to the situations when user's own weight, power cable, or dumbbells are providing resistance. The resistance cannot be controlled by video gaming system Although they are not yet reached the commercial mainstream, there are a lot of designs of aerobic exercise equipment that provide for connection with video gaming system. The parameters of aerobic exercise equipment (e.g., brake force for a bike or belt speed for a treadmill) are relatively easy to adjust by an electronic control. On other hand, the information on progress of the exercise, e.g. distance or calories burned, is easy to compute and feed to a video gaming system.

Strength training is equipment is more difficult to couple with video gaming system. First of all, strength training normally require repetitions comprising of concentric and eccentric phases. For an efficient exercise, resistance shall be dependent on one or many of the following: position, repetition number, velocity.

U.S. Pat. No. 7,278,958 to Morgan describes variable resistance strength training machine. The variation of resistance is achieved by mechanically adjusting able pulley system. The adjustment process is initiated by a human. The machine still requires weight stack and frame and does not coupled with a video gaming system.

U.S. Pat. No. 4,512,567, Phillips, entitled "Exercise Bicycle Apparatus Particularly Adapted for Controlling Video Games," issued Apr. 23, 1985. This patent shows an exercise bicycle that is used to control and fully operate a video game by use of electrical signals. These electrical signals are based on the motion of the handlebars as well as signals proportional to the speed at which the bicycle is being operated. This invention requires the use of an electrical generator and is limited to use with only exercise bicycles.

U.S. Pat. No. 5,645,513 to Haydocy et al. teaches an exercise bike that controls video gaming system, providing game level rewards for achievement during exercise. It limited to aerobic exercise, requires a bulky exercise machine and does not provide for adjusting of exercise equipment parameters by video gaming system.

U.S. Pat. No. 6,749,537 to Hickman shows an exercise equipment connected to a local computer, which is in turn connected to a remote system. The patent teaches control of equipment resistance (e.g., exercise bike brake) by a computer system, and provides means for virtual group exercise. The patent does not teach energy recuperation during strength trainings repetitions, nor provide means for reinforcing video game environment nor automated personal training during exercise U.S. Pat. No. 4,235,437, Ruis et al, entitled "Robotic Exercise Machine and Method", discloses a hydraulic driven and controlled apparatus which can be programmed to provide a number of different exercise paths for a user. These paths must be programmed for each new user by a trained technician. The device lacks the simplicity necessary for use in a health club or spa type environment. Moreover, two separately controlled, hydraulically driven links are required for its operation.

U.S. Pat. No. 4,919,418 to Miller, entitled "Computerized drive mechanism for exercise, physical therapy and rehabilitation", discloses a microcontroller based strength training machine that provide for both concentric and eccentric exercise. The control is limited to providing constant velocity during repetitions. The patent does not teach energy recuperation during concentric/eccentric repetitions, nor a connection with video gaming system. The device is bulky and can not be used as a gadget.

U.S. Pat. No. 4,880,230 to Cook teaches a pre-electronic era pneumatic strength training gadget. Device allows to manually adjust resistance, separately for forward and backward movement. However, this invention does not provide for eccentric exercise, Nautilus style exercise, nor for a connection to video gaming system.

None of the prior art is concerned with provision of a resistance based strength training closely coupled with a video gaming system that provides a reinforcing video game or a coaching.

DEFINITIONS

A video gaming system is an interactive entertainment computer or electronic device that produces a video display signal which can be used with a display device (a television, monitor, etc.) to display a video game or directly on a portable device like smart phone or PDA (Personal Digital Assistant). The term "video game console" is used to distinguish a machine designed for consumers to buy and use solely for playing video games from a personal computer, which has many other functions. In the invention, video gaming system is operated to run either entertainment (game), physical training or therapeutic software. video gaming system can be connected to the Internet. The software can be further configured to interact with peer systems or central server to exercise history, settings. In addition to operative connection with the exercise equipment. video gaming system can be coupled with general purpose (key board, mouse, monitor, joystick, camera, microphone) and specialized (position sensors, accelerometers, voltage sensors, heart rate monitors, blood pressure modules) peripheral devices. The exercise software can either reside on video gaming system system or on the server, in the later case the use experience will be provided by some thin client (e.g, browser or Java). video gaming system is distinguishable from specialized exercise computers; as video gaming system can normally be configured to run non only the exercise software, but other games or general purpose software (media player, Internet browser, office productivity suite, etc). For further clarity, WII, XBox, Playstation, Personal computer, netbook, smartphone are examples of video gaming system, while computer embedded into treadmill for entertainment or control is not a video gaming system. In some embodiments, the video gaming system comprises a thin device in a proximity to the exercise person and a cloud. For example, a smart phone or Chrome based notebook can actually perform minimum of the computations locally and the rest can be performed by the cloud. Such configurations fell within the scope of invention.

Pose tracking is a computer vision technique that allows to trace movement of body parts based on the input from video cameras. The review of various vision based pose tracking techniques can be found in the paper "A Survey of Computer Vision-Based Human Motion Capture" by Thomas B. Moeslund and Erik Granum, Computer Vision and Image Understanding Volume 104, Issues 2-3, November-December 2006, Pages 90-126, which is incorporated here by reference. Fiduciary marks are frequently used to increase the quality of pose tracking and reduce computational requirements. Pose tracking can also be achieved by attaching accelerometers to the body parts of interest and integrating their signals.

Virtual group exercise—users can either see their "virtual images", or see each other by video link, or see each other progress. Users can either exercise simultaneously or independently. The exercise can be organized as a competition or tournament.

Strength training is the use of resistance to muscular contraction to build the strength, anaerobic endurance and size of skeletal muscles. The basic principles of strength training involve a manipulation of the number of repetitions (reps), sets, tempo, exercises and force to cause desired changes in strength, endurance, size or shape by overloading of a group of muscles. Typically, each rep contains a concentric and eccentric steps, where
Concentric-exercise where there is movement in the direction force is applied. (For example when a bar bell is lifted from the floor.)
Eccentric-exercise where there is movement in the direction opposite to the direction of the force applied. (For example when a bar bell is lowered to the floor.)
Isokinetic-exercise where the speed of exercise motion is held constant during a dynamic contraction, so that external resistive force varies in response to magnitude of muscular force.
Isometric-exercise where the speed of exercise motion is substantially zero.
Integrated electrical motor/alternator—an electric mechanical device whose rotor is coupled to a resistance cable. It is used as an electric drive and also as a recuperative brake. Brake energy is converted into electric energy and stored in a battery using an intelligent energy management. Thus, the energy can later be reused for creating of a torque assist or for providing a service driving functions to adjust the resistance cable position and length. The ultra-capacitor could be used instead of or as an addition to the battery. It is capable to deliver up to 10 times the power and longevity of batteries, requires no maintenance and operate reliably in extreme temperatures and vibrations.

Exercise professional: coach, experienced peer or friend, physiotherapist, kinesiologist, personal trainer, etc.
Adjustable resistance—resistance that can be easily adjusted between exercise sets.
Variable resistance—resistance that can be varied within individual rep, for example to emulate Nautilus style equipment or force isokinetic exercise.

BRIEF SUMMARY OF THE INVENTION

An aspect of the invention is that a video gaming system facilitates strength training exercise and monitors it's progress and is aware of at least approximate resistance force magnitude during the exercise.

An aspect of the invention is that the awareness is achieved by communication of information with the exercise device. In some embodiments, the video gaming system controls or adjust the resistance by sending a signal, for example a digital wireless signal to the strength training machine. The signal may either specify a resistance setting, or a force curve, or be an applet with program or byte code programming the response. In some embodiments, the strength training machine sends a signal, for example a digital wireless signal, indicative of resistance settings or current resistance. In some embodiments, a two way communication is established. In other embodiments, the communication of information is enabled by sensing techniques, for example computer vision. In an embodiments, the software on video gaming system uses a signal from a coupled video camera to analyze the image or video signal, and applies segmentation and computer vision techniques to recognize the selected exercise object or it's settings or use.

In an embodiment, the exercise progress monitoring is achieved by receiving a signal, for example a digital wireless signal, from the exercise device. For example, the exercise device may have an accelerometer, and the information about velocity and integrated position is transmitted to the video gaming system.

In an embodiment, the exercise progress monitoring is achieved by using pose tracking techniques from a video signal using a video camera coupled with the video gaming system. The techniques for exercise progress monitoring could be combined.

In an embodiment, the data of exercise progress monitoring are used to coach user on exercise techniques. For example, the video gaming system can generate an audio or video signal advising user to improve posture, movement of range, and velocity.

An aspect of the invention is that the video gaming systems monitors the velocity during strength training exercise, and generates a signal aiming at achieving a proper velocity. In an embodiment, the signal is audio or video signal advising user to improve exercise technique. In another embodiment, the signal is digital signals send to the strength training machine to adjust resistance. Both techniques could be used in a consent.

An aspect of the invention is that the video gaming system advantageously aware of at least one physiological parameter, for example heart rate, blood pressure, breathing rate, oxygen level in the blood, sugar level, etc. In an embodiment, a conventional sensor is attached to the player body. Conventional sensor might be either in a separate enclosure, or be part of an exercise device or game controller. The sensor sends the information to video gaming system over a digital wireless connection. In other embodiments, a non-contact to measure a physiological parameter advantageously used. For example, the data from a visible light or infrared video camera coupled with a video gaming system could be analyzed to derive heart rate, breathing rate, and the dynamic of the oxygen level. The video gaming system is advantageously configured to use this information to adjust parameters of the current and/or future exercise to optimize workout effect and reduce the health risks. This is could be achieved by an audio or video indication to the user, or by adjustment of the resistance force by means of sending the signal to the strength training apparatus. The use of other computing devices that are not a video gaming system to use non-contact physiological parameter monitoring (for example, video camera based heart rate monitoring) to tune-up the exercise is an embodiment of this invention. Video camera can be an integral part of the video gaming system.

An aspect of the invention that the video gaming system advantageously configured to estimate the level of exhaustion of the user during the exercise, and advantageously uses this information to adjust parameters of the current and/or future exercise to optimize workout effect and reduce the health risks. This could be achieved by an audio or video indication to the user, or by adjustment of the resistance force by means of sending the signal to the strength training apparatus.

An aspect of the invention that the video gaming system is configured to use monitored parameters to prompt user to adjust exercise technique, such as velocity, range of motion, posture, or effort.

An aspect of this invention is that the video gaming system is advantageously configured to use information about progress and time spent during exercise to control a non-directly related activity, for example access to video games or movies, the ratings of movies or artifacts in video games, etc.

An aspect of this invention that the strength training apparatus is configured to pulsate (vibrate) resistance by changing it's magnitude (or even dropping it's to zero). The pose tracking and exercise monitoring information is advantageously used by the video gaming system to control the pulsation to optimize workout effect and reduce the health risks.

An aspect of the invention is a game controller that can provide variable or adjustable resistance during strength training exercise and therefore forms a strength training machine. The machine is coupled with off-the shelf video gaming system (video gaming system). It could be coupled by a Bluetooth, Zigbee, or TCP/IP over a WiFI wireless connection, or through a wired interface such as USB. video gaming system is off the shelf game console (such as Xbox 360 or WII), or personal computing device, such as desktop computer, notebook, netbook, smartphone, or smart book.

It is another aspect of this invention that the controller can provide variable resistance by utilizing a hydraulic apparatus, an electrical hoist, or an electrical linear actuator.

It is another aspect of this invention that video gaming system is configure to run software that supports user during exercise by providing a reinforcing video game experience and coaching the use.

It is another aspect of this invention that the said controller has a microcontroller, that manages the resistance provided to user and communicates with video gaming system. A microcontroller could be a tightly integrated device with wireless interfaces, ADCs and DACs, or on the alternative, a less integrated computing device that communicates through necessary peripherals through a bus. The microcontroller could be a high end application processor or basic 8-bit microcontroller dependent on the embodiment's needs. Microcontroller could be implemented in FPGA or ASIC.

It is aspect of this invention that microcontroller adjust the resistance based on one or more of the following: position, repetition number, type of exercise, user profile, velocity. Microcontroller could either compute the resistance independently, receive functional dependency from video gaming system, or just receive current force from video gaming system.

It is another aspect of this invention that the microcontroller transmits to video gaming system information on the user progress, such as force, velocity, position, number of repetitions, calories burned, or user's vital signs.

It is another aspect of this invention that the resistance is provided by electric motor configured to generate energy during concentric movement and to use energy during eccentric movement, and this energy is recuperated by storing in a super capacitor.

DETAILED DESCRIPTION OF THE INVENTION

Figure 1:
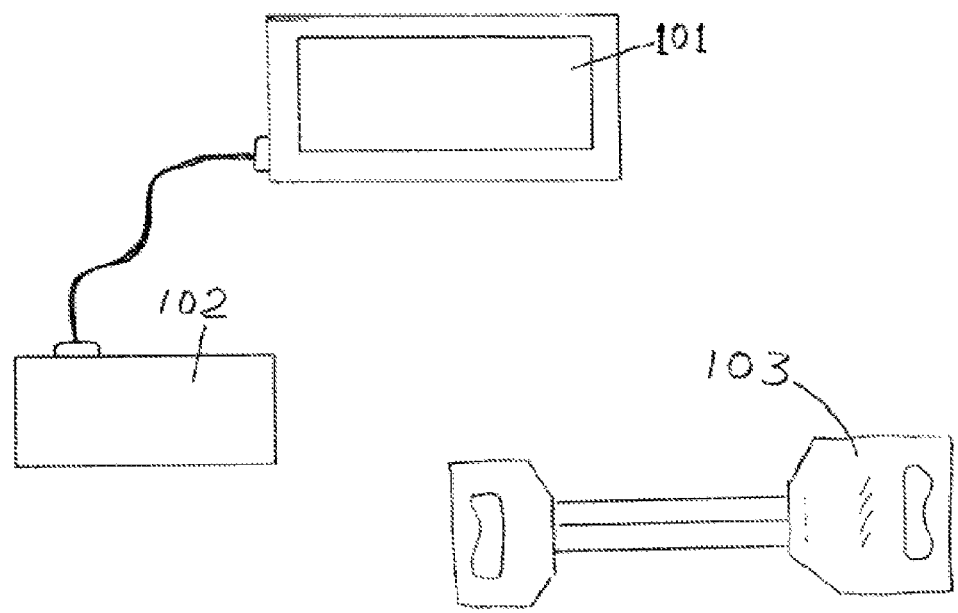
FIG. 1 is overall view of invention when coupled with Nintendo WII.

| | |
|---|---|
| 101 | TV |
| 102 | Nintendo WII |
| 103 | muscle training machine |
| 201 | Mouse |
| 202 | desktop home computer |
| 203 | Bluetooth adapter |
| 204 | keyboard |
| 205 | Monitor |
| 206 | muscle training machine |
| 301 | Box |
| 302 | Touchscreen |
| 303 | electronic control module |
| 304 | internet server |
| 305 | Motor |
| 306 | Blocks |
| 307 | interchangeable handle |
| 308 | Internet |
| 309 | wireless router |
| 310 | video camera |
| 311 | Local computer |
| 401 | Handle |
| 402 | Motor |
| 403 | electronic control module |
| 404 | fiduciary mark |
| 405 | Handle |
| 406 | Cable |
| 501 | elastic band |
| 502-503, 601-603 | fiduciary mark |
| 701 | LinkMatik 2.0 Bluetooth transceiver |
| 702 | Microchip micro controller PIC 16C745 |
| 703 | Micro Drives optical Encoder E4P - 300 series |
| 704-708 | Micro Drives DC gear motor M22P series |
| 709-712 | Pulse Width Modulation (PWM) control signal |
| 713-715 | switch |
| 717 | Maxwell ultra-capacitor BCA PO350 |
| 718, 719 | resistor |
| 720 | VDD1 |
| 721 | voltage signal |
| 722 | Signal AN3 |
| 723 | Signal AN2 |
| 724 | Hand grip sensor contacts |
| 725 | National Semiconductor operational amplifier LMC 64 |
| 726 | Analog Devices Tri-Axis Inertial Sensor ADIS16350 |
| 727 | Omron round switch A-22-1 |
| 801 | heart rate sensor |
| 802 | body |
| 803 | motor |
| 804 | electronic control module (ECM) |
| 805 | battery |
| 806 | cable |
| 807 | spots spring |
| 808 | sensor |
| 901 | position |
| 902-904 | force |
| 1001 | frame |
| 1002 | cable |
| 1003 | gear box |
| 1004 | electric motor |
| 1101 | handle |
| 1102 | hydraulic cylinder |
| 1201 | adjustable handle |
| 1202 | commercially available actuator |
| 1301 | grip handle |
| 1302 | exercise box |
| 1303 | web-cam |
| 1401 | model of the patient hand |

-continued

| | |
|---|---|
| 1402 | current velocity |
| 1403 | visual guidance |
| 1405 | therapeutic limit |
| 1406 | audio/visual warning |
| 1501 | Force |
| 1502 | Position |
| 1503 | Zone of therapeutic efficiency |
| 1504 | Force level 1 |
| 1505 | Force level 2 |
| 1601 | Resistance force |
| 1602 | Time |
| 1603 | period of resistance pulsing |
| 1604 | Force Level 1 |
| 1605 | Force Level 2 |
| 1701 | Dumbbell |
| 1702 | Barcode |
| 1801 | User with dumbbells |
| 1802 | Camera |
| 1803 | Dumbell |
| 1804 | Known size object |
| 1901 | user |
| 1902 | camera |
| 1903 | Handle |
| 1904 | adjustable resistance band |
| 1906 | black area |
| 1907 | color 1 |
| 1908 | color 2 |
| 1909 | color 3 |
| 2001 | user |
| 2002 | camera |
| 2003 | handle |
| 2004 | rubber band |
| 2005 | coloured stripes |
| 2101 | Exercise Software |
| 2102 | Points Bank |
| 2103 | Game Software |
| 2201 | identify user |
| 2202 | analyze user exercise need |
| 2203 | compute plurality of group of exercise options |
| 2204 | user selection |
| 2205 | compute plurality of recommended exercises |
| 2206 | user selection |
| 2207 | display recommendation how to perform exercise |
| 2208 | receive current resistance settings |
| 2209 | adjust or suggest adjustment of resistance settings |
| 2210 | supervise workout |
| 2211 | add points to the point bank |
| 2301 | resistance band |
| 2302 | user |
| 2303 | door gym |
| 2304 | color coding |
| 2305 | adjusting knob |
| 2306 | camera |
| 2401 | isometric device |
| 2402 | user |
| 2403 | color contrast numbers |
| 2404 | camera |
| 3401 | Gun |
| 3402 | gun ammo |
| 3403 | Accelerometer gesture |
| 3501 | Muscle training handle/controller |
| 3502 | Bluetooth HID profile |
| 3503 | Computer/video gaming system |
| 3504 | Joystick events |
| 3505 | Glove Pie Driver |
| 3601 | puzzle fragment |
| 3602 | picture |
| 3701 | exercise menu portion |
| 3702 | on-line services |
| 3703 | history records |
| 3801 | guest |
| 3802 | user 1 |
| 3803 | user 2 |
| 3901 | egg |
| 3902 | basket |
| 4001 | Target force zone |

-continued

| | |
|---|---|
| 4101 | exercise professional |
| 4102 | professional's computer |
| 4103 | internet |
| 4104 | application server |
| 4105 | exercise history |
| 4106 | muscle training box |
| 4107 | user |
| 4108 | monitor |
| 4109 | exercise regime |
| 4110 | video gaming system |
| 4201 | Force sensor |
| 4202 | Position sensor |
| 4203 | controller |
| 4204 | accelerometer |
| 4205 | buttons/joystick |
| 4206 | Pointer Bluetooth HID |
| 4207 | video gaming system |
| 4208 | current exercise |
| 4209 | repetitions/set |
| 4210 | translation to game |
| 4211 | controlling |
| 4212 | application server |
| 4213 | on-line profile |
| 4214 | professional recommendations |
| 4301 | motor |
| 4302 | gear box |
| 4303 | cable |
| 4304 | electronic module |
| 4305 | cooling fan |
| 4401 | power supply |
| 4402 | wireless connection with video gaming system or PC |
| 4403 | microcontroller |
| 4404 | motor driver with recuperation |
| 4405 | re-chargeable battery |
| 4406 | position sensor |
| 4407 | motor |
| 4408 | gear box |
| 4409 | pulley |
| 4410 | cable |
| 4411 | handle |
| 4412 | joystick |
| 4413 | control buttons |
| 4414 | resistor |
| 4501 | power supply |
| 4502 | wireless connection |
| 4503 | microcontroller |
| 4504 | motor driver |
| 4505 | current sensor |
| 4506 | position sensor |
| 4507 | radio link |
| 4508 | motor |
| 4509 | gear box |
| 4510 | pulley |
| 4511 | cable |
| 4512 | handle |
| 4513 | joystick |
| 4514 | control buttons |
| 4701 | reed switch |
| 4702 | microcontroller |
| 4703 | RF module |
| 4801 | pulley roller |
| 4802 | magnet |
| 4803 | pulley body |
| 4804 | reed switch |
| 4805 | cable |
| 4901 | concentric motion 1 |
| 4902 | user |
| 4903 | handle with retractable cord |
| 4904 | strain sensor |
| 4905 | control buttons |
| 4906 | joystick |
| 4907 | RF link |
| 4908 | cord |
| 4909 | pulley with position sensor |
| 5401 | Handle 1 |
| 5402 | Tension sensor |
| 5403 | cord |
| 5404 | button 1 |
| 5405 | button 2 |

| | |
|---|---|
| 5406 | handle 2 |
| 5407 | controller module with WiFi |
| 5501 | user |
| 5502 | handle |
| 5503 | handle |
| 5504 | extension with pulley |
| 5505 | cord |
| 5506 | extension without pulley |
| 5507 | bord |
| 5601 | Pulley |
| 5602 | WII balance board |
| 5603 | Extension board |
| 5604 | rope under the extension board |
| 5605 | user |
| 5801 | Flexible metal base |
| 5802 | cable |
| 5803 | Carbon based conductive ink |
| 5804 | insulating flexible substrate |
| 5805 | metalized highly conductive pad |
| 5806 | metalized highly conductive pad |

FIG. 1 depicts the muscle training machine 103 coupled with Nintendo WII 102 video gaming system. Nintendo WII 102 is connected to a TV 101. The muscle training machine 103 is a wireless game controller, further described on FIG. 4.

Figure 2:
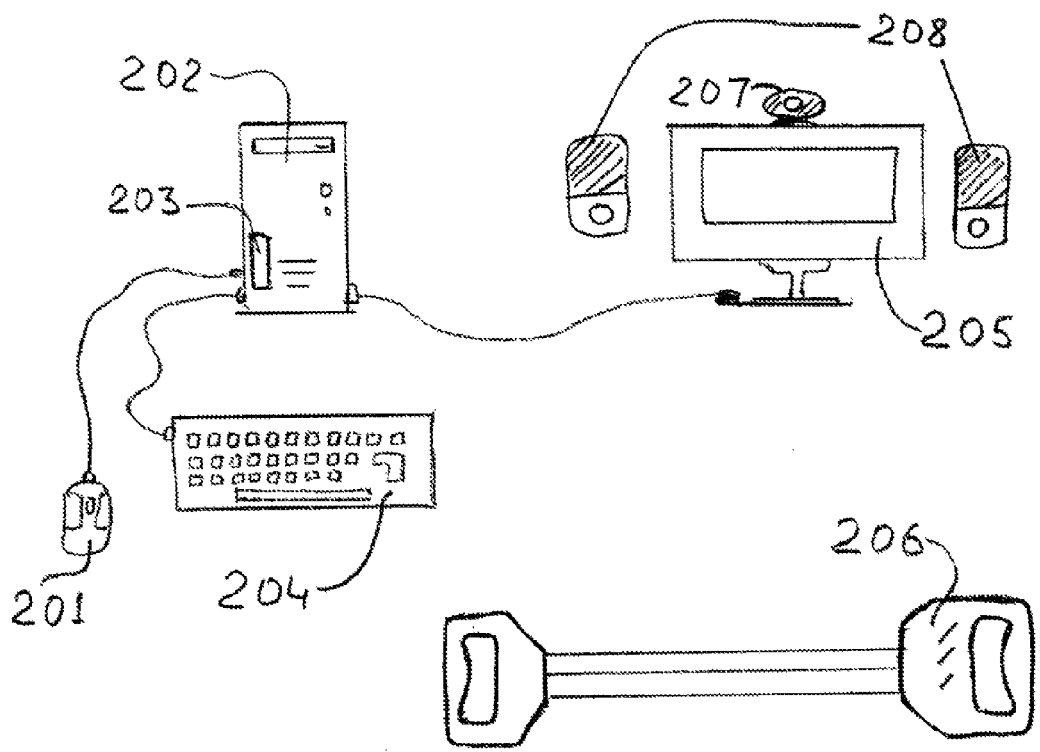
FIG. 2 is overall view of the invention when coupled with a personal computer.

FIG. 2 depicts the muscle training machine 206 coupled with a desktop home computer 202. Computer runs an exercise game, that can established link with the training machine 206 through bluetooth adapter 203. Exercise game takes extra input from keyboard 204 and mouse 201 and provide audio communication to the user through speakers 208 and video communication through monitor 205. Further, exercise software incorporates the pose tracking subsystem based on open source ARToolKitPlus. The pose tracking subsystem relies on web camera 207 for the video input.

Figure 3:
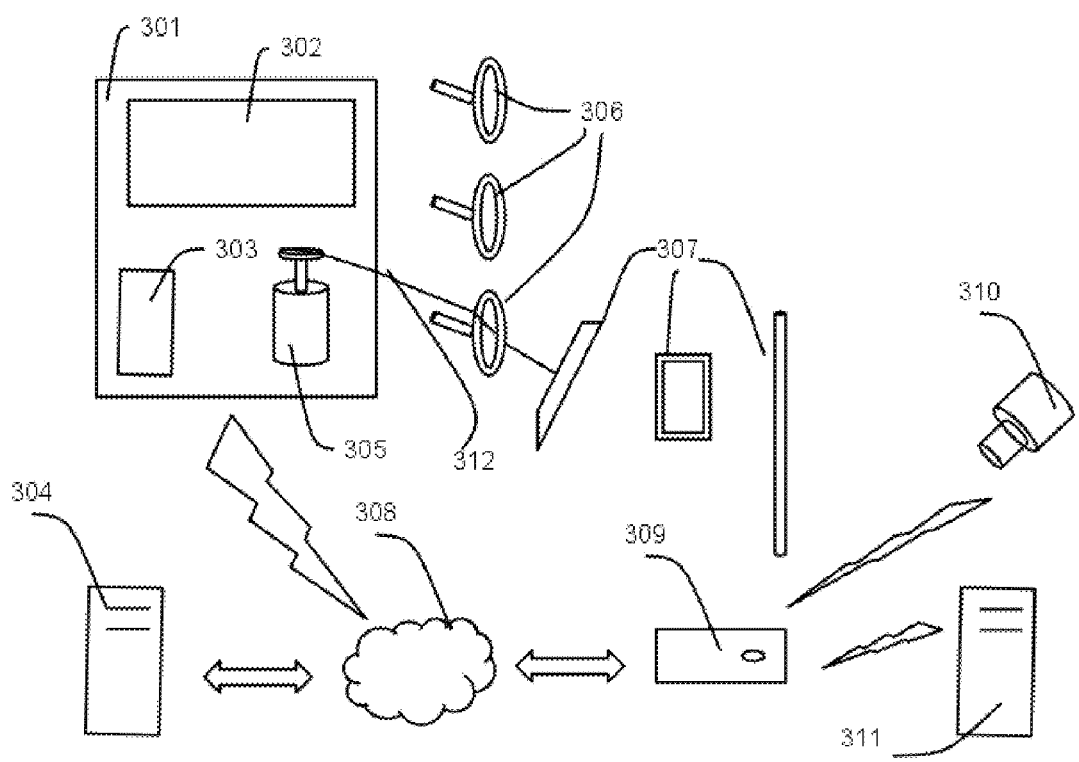
FIG. 3 is an overall view of alternative embodiment.

FIG. 3 depicts the muscle training machine that is loosely coupled with video gaming system. The machine is embodied as a box 301 with touchscreen 302, hoist with motor 305 and electronic control module 303. Electronic control module 303 is similar in design to the module depicted in FIG. 7, but the microcontroller 702 is replaced with a more powerful Atmel AT91SAM9RL64. On the alternative, a more powerful ARM 11 based microcontroller (such as STMicro STA2065 application processor) is added and communicates with the microcontroller 702 using I2C bus. Further, the bluetooth module 701 is replaced with WIFI module. Other changes apparent to one ordinary skilled in the art might be needed. The box 301 and the blocks 306 are secured to the wall, were blocks 306 are secured at different height. The hoist cable 312 is routed though one of the blocks 306 and is terminated by one of the interchangeable handles 307. Electronic control module 303 establish WiFi connection to wireless router 309, that using the Internet 308 provide TCP/IP connection to the internet server 304. The microcontroller in ECM runs Windows CE operating system, and using Microsoft Silverlight based user interface, allows to select individual exercises and workouts, adjust the resistance, and track the progress. Using Web Services framework, the software communicates with the internet server 304, which used to store user profiles and distribute data on workouts and exercises. Local computer 311 might run exercise software. The exercise software and electronic control module 303 mutually will try to discover each other using broadcasting on the local network. If TCP/IP communication is established, the exercise software provides exercise coaching and video games enriching the user experience. Optional Wifi camera 310 provides video stream for the pose tracking, which is implemented on either electronic control module 303 or desktop computer 311.

Figure 4:
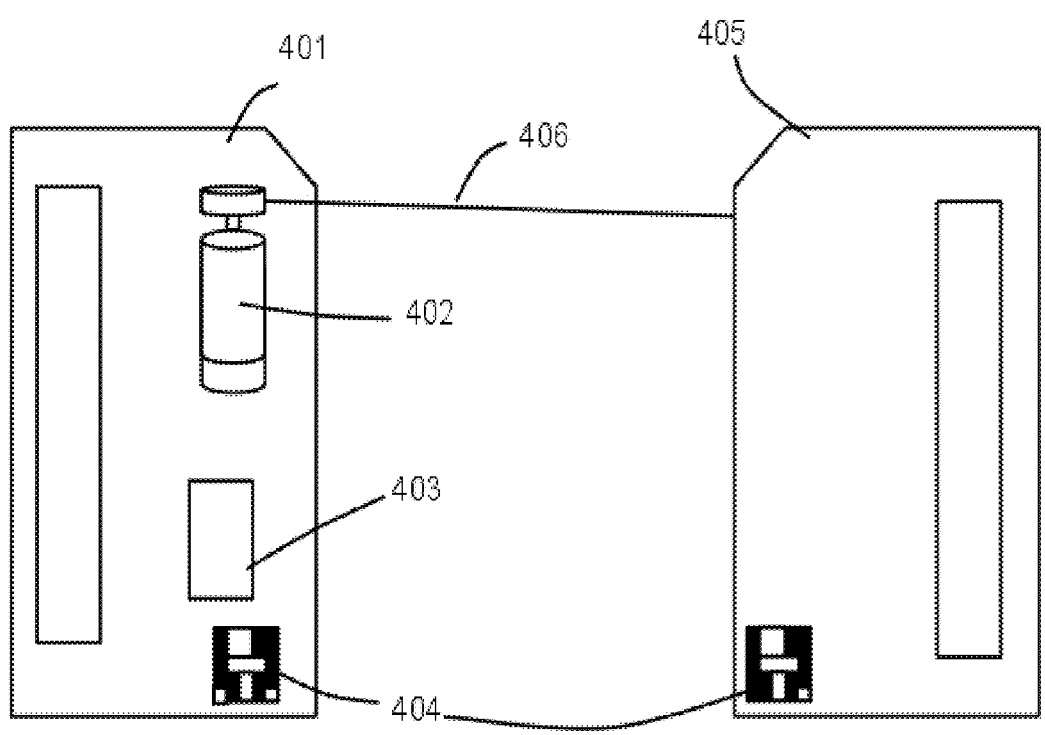
FIG. 4 is a diagram of the invention embodied as a wireless power cable with variable resistance.

FIG. 4 depicts the embodiment of the invention as a wireless game controller appearing as a power cable. Handles 401 and 405 are connected by cable 406. Cable is attached to the host powered by the motor 402 connected with electronic control module 403. To facilitate pose tracking, handles have several pictures of fiduciary marks 404.

Figure 5:
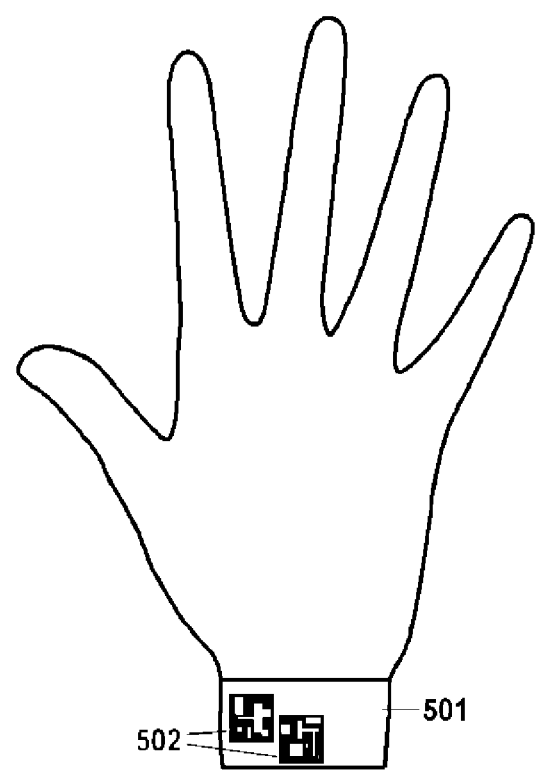
FIG. 5 is an elastic (wrist or ankle) band to assist with video based pose tracking.

FIG. 5 depicts an elastic band 501 with fiduciary marks 502 that can be worn on wrists or ankles during exercise to facilitate pose tracking.

Figure 6:
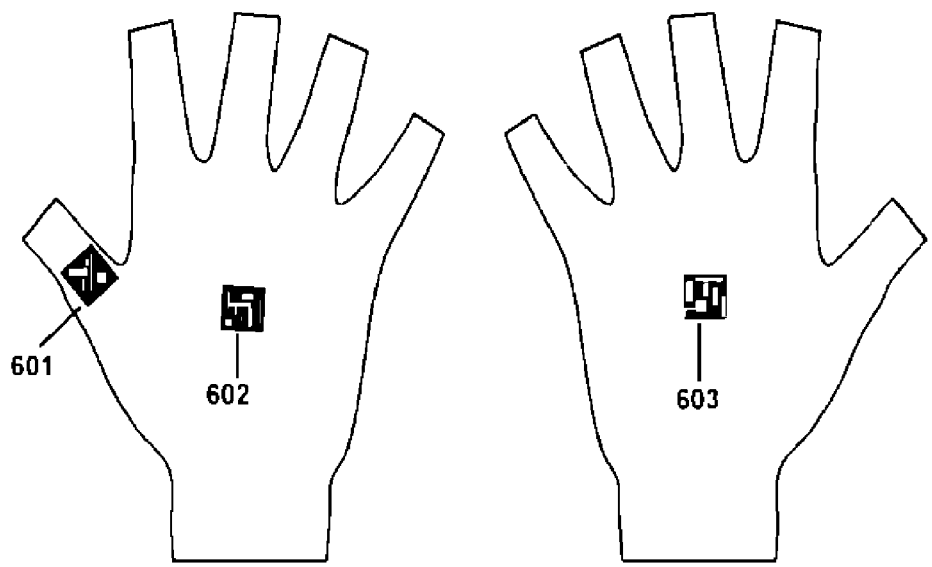
FIG. 6 is a pair of a weight training gloves to assist with video based pose tracking.

FIG. 6 depicts weight training gloves with images of fiduciary marks 601, 602, 603. Fiduciary marks are located to ensure visibility of at least one of the mark regardless of fingers' and arms' position.

Figure 7:
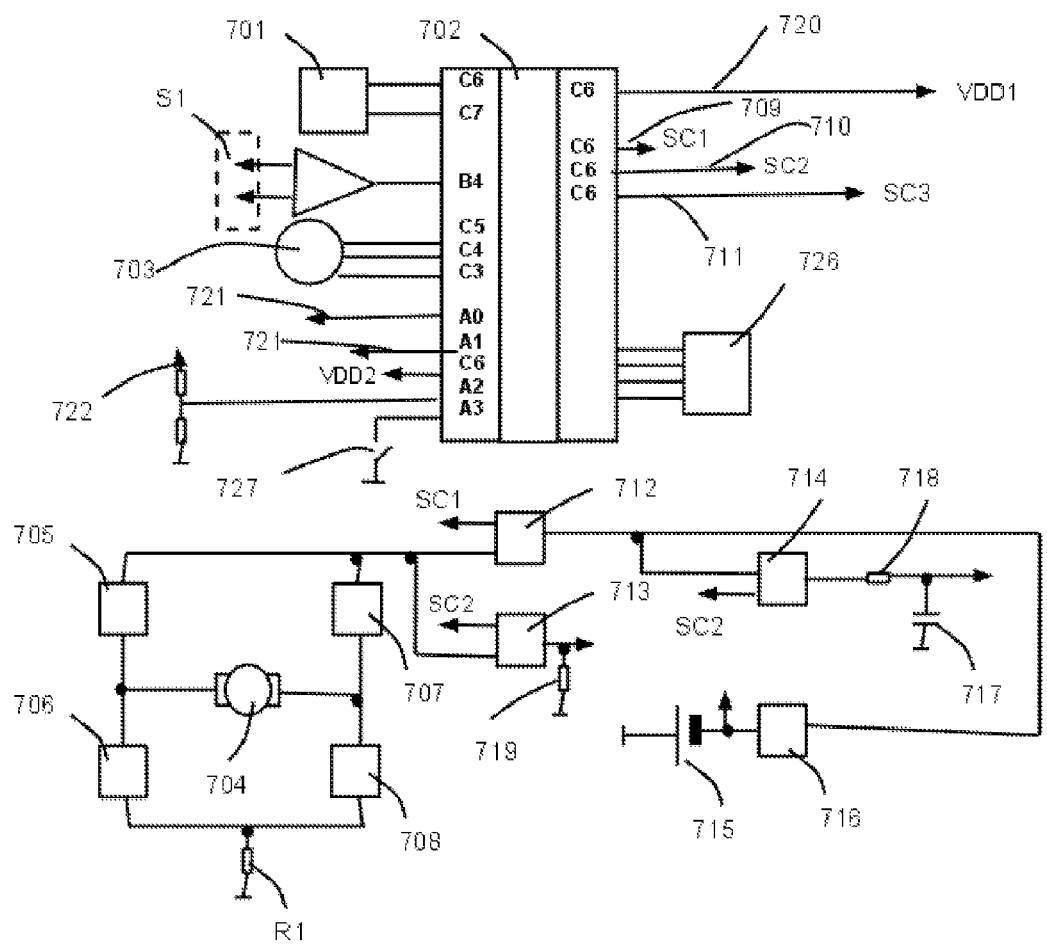
FIG. 7 is a schematic diagram for one of the embodiments.

FIG. 7 depicts the Electronic Control Module (ECM) electric schematics.
electric elements specified on the schematic are:

| | |
|---|---|
| D1 701 | LinkMatik 2.0 Bluetooth transceiver |
| D2 702 | Microchip micro controller PIC 16C745 |
| D3 725 | National Semiconductor operational amplifier LMC 64 |
| D4 716 | Texas Instruments boost regulator TPS 61080 |
| D5 726 | Analog Devices Tri-Axis Inertial Sensor ADIS16350 |
| M1 703 | Micro Drives optical Encoder E4P - 300 series |
| M2 704 | Micro Drives DC gear motor M22P series |
| C1 717 | Maxwell ultra-capacitor BCA PO350 |
| S1 724 | Hand grip sensor contacts |
| S2 ... S8 705 ... 708 | National Semiconductor Power MOSFET IRL 520 |
| IS5 727 | Omron round switch A-22-1 |

Serial to Bluetooth data link module D1 701 provides connection of the Electronic Control Module (ECM) to a standard Bluetooth enabled host (playstation, laptop/desktop computer, PDA, mobile phone. ECM is controlled by firmware of the micro controller D2 702. Communication portion of the irmware supports the communication link between ECM and a host. Serial data input RTS and serial data output TXD of module D1 701 and microcontroller D2 702 are used to serially connect them.

The firmware continuously monitors the output pulses of the incremental optical servo drive shaft encoder M1 703.

Gear motor M2 704 works as the ECM servo drive. Gear motor M2 704 provides a driving torque or provides a resistive torque in active or passive dynamic mode functioning as a controlled brake to maintain the necessary exercise cord tension level. Switches S5 705, S6 706, S7 707, S8 708 are controlling the polarity of pulse width modulated signal (PWM) supplied to the motor 704. Pulse Width Modulation (PWM) control signals SC1 709, SC2 710, SC3 711 are supplied through the power MOSFETs S2 712, S3 713, S4 714 to the gear motor M2 704. S2 712 switch provides PWM of VDD2 amplitude to the gear motor 704. VDD is supplied from the main energy source: rechargeable battery V1 715 through the DC-DC converter D4 716 or from the alternative energy source: ultra-capacitor C1 717. The ultra-capacitor C1 717 charging/re-charging is controlled by the switch S4 714. Charging current is limited by the resistor R3 718. The ultra-capacitor C1 717 provides a high current boosting energy source for the servo drive. In case of rechargeable battery 715 and capacitor 717 been fully charged, the S3 713 switch provides connection of the motor 704 to the damping resistor R2 719. VDD1 720 level of the battery voltage is monitored by the microcontroller D2 702. AN1 voltage signal 721 monitored by the microcontroller 702 represents the gear servo motor 704 current. AN3 722 signal monitored by microcontroller 702 represents the charge voltage of the ultra-capacitor C1 717. Signal AN2 723 monitored by microcontroller 702 represents the dumping resistor current for the Motor M2 704 which could be used for dynamic breaking when negative passive motor torque is used to maintain the level of resistance during the resistance training exercise.

Hand grip sensor S1 724 provides electrical pulses detected from user's hand which allows to calculate current heart beat rate of the user. Pulses are getting amplified by operational amplifier D3 725 and are getting monitored by the microcontroller D2 702. Information about the current user's heart beat rate gets sent to the host computer or video game consul through wireless interface of the module 701. Information about current acceleration of the ECM is provided by the 3D accelerometer D5 726. Video game can show user in real time the better way to perform exercise and at the same time to adjust the resistance level of exercise to maintain the heart beat in the safe range.

Figure 8:
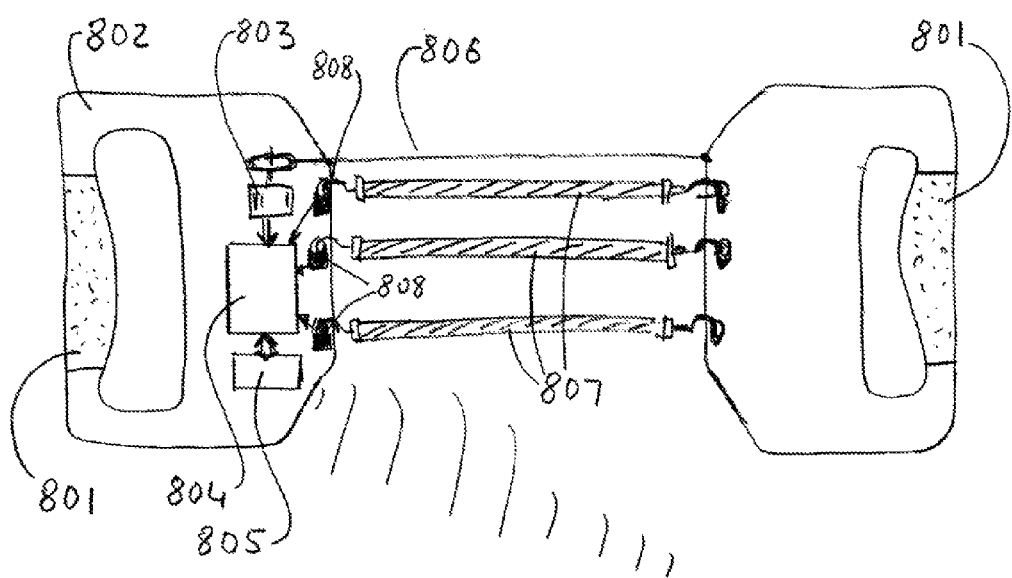
FIG. 8 is a diagram of the invention embodied as a wireless power cable with adjustable resistance.

FIG. 8 depicts wireless game controller for strength training where resistance is provided by dynamic force. The controller comprises 2 handles with embedded heart rate sensors 801. Handles are connected using plurality of springs 807. User can adjust the resistance by changing number springs. In one of the handle, electronic circuit is placed inside the body 802. The circuit contains motor 803 attached to a hoist, electronic control module 804, and battery 805. The electronic control module (ECM) 804 is designed similar to the electronic control modules depicted on FIG. 7, however, the capacity of capacitor 717 is substantially reduced as there is no need to provide substantial resistance. Motor is used just to trace the distance between the handles. There are sensors 808 located in the spots springs 807 attached to the body 802. Those sensors are connected to ECM to enable counting of number of springs used during the exercise. ECM is configured to periodically transmit to video gaming system information about exercise: number of reps performed, energy used, current distance between handles, the pulse, position and velocity from the accelerometer.

Figure 9:
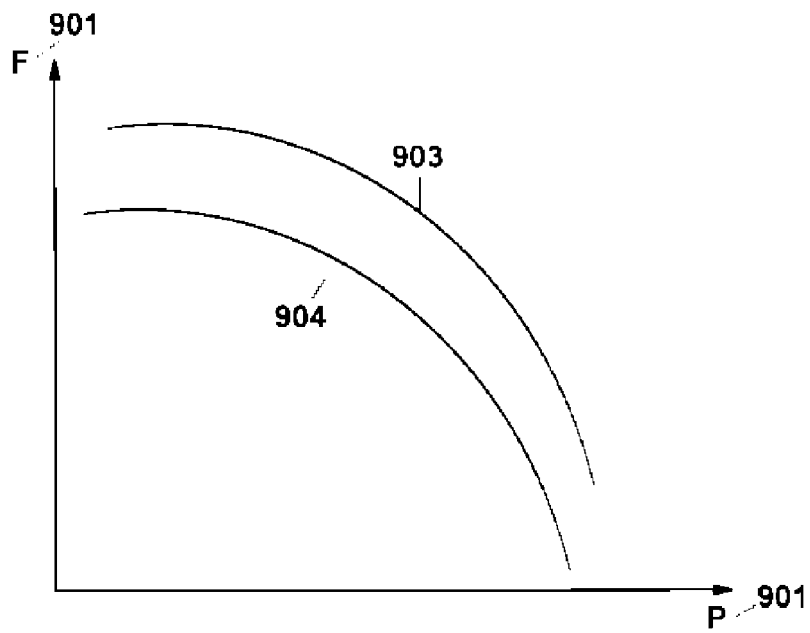
FIG. 9 is a graph of resistance force as a function of position during eccentric and concentric steps.

FIG. 9 depicts exemplary dependence of force 902 from position 901 during one rep of the exercise. During concentric step of the exercise motor is configured to use force 903. Motor generates energy that is stored in the capacitor 717. During eccentric step, motor recuperates energy and is configured to use force 904. Overall energy needed during the eccentric step is smaller than the energy generated during concentric step, which allow for the non-100% recuperation. This is needed in case of wireless embodiment. In the case when the resistance mechanism have access to an AC power supply, the force during eccentric step could be higher than during concentric step.

Resistance can be provided by various means known in the art depicted on

Figure 10:
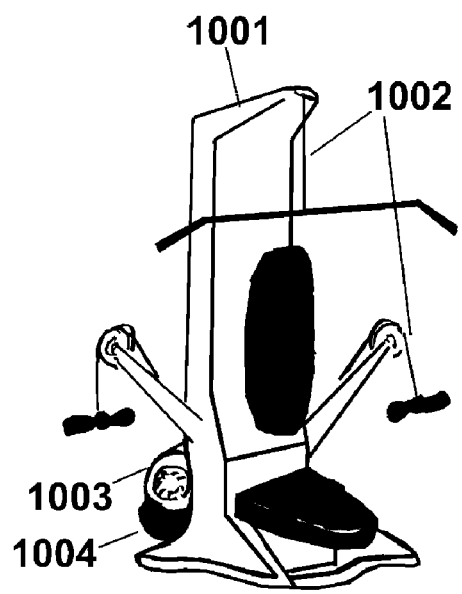
FIG. 10 is a known in the art hoist mechanism to provide variable resistance
Figure 11:
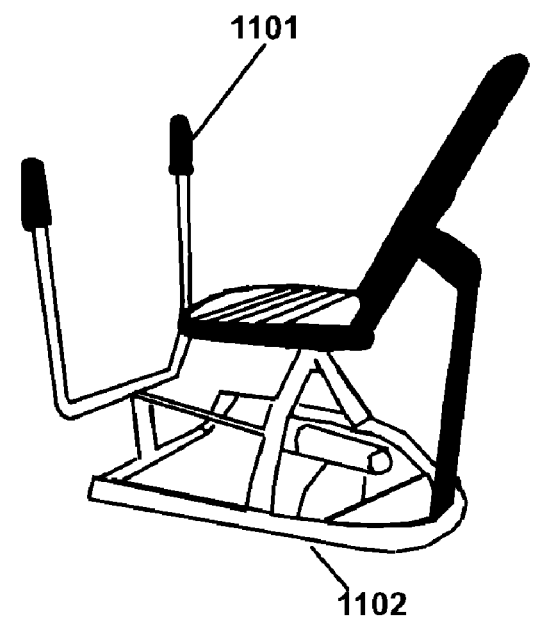
FIG. 11 is a known in the art hydraulic mechanism to provide variable resistance.
Figure 12:
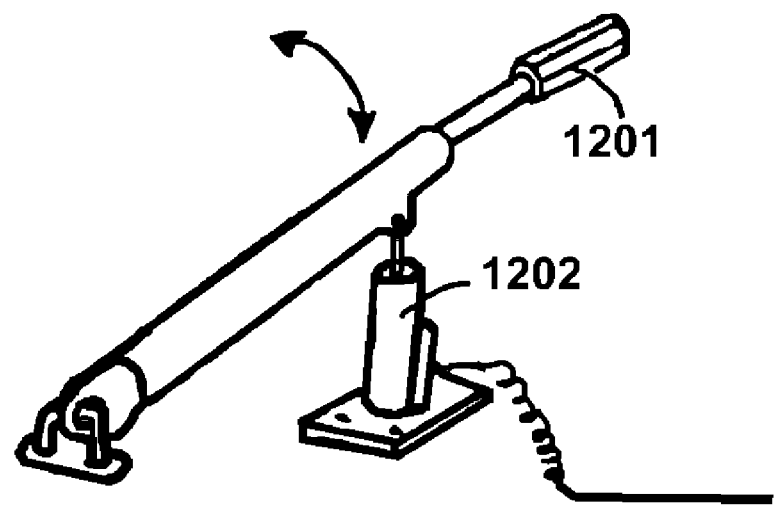
FIG. 12 is a known in the art electric linear actuator mechanism to provide variable resistance.

FIGS. 10-12. FIG. 10 depicts a weight training machine where resistance is provided by an electrical motor/generator. 1001 is frame, 1002 is cable, 1003 is a gear box and 1004 is an electric motor. FIG. 11 depicts a weight training machine where resistance is provided by a hydraulic mechanism. 1101 is handle, 1102 is hydraulic cylinder. FIG. 11 depicts a weight training machine where resistance is provided by an electrical linear actuator. 1202 is a commercially available actuator, 1201 is an adjustable handle. Those machines can be coupled with video gaming system by an electrical circuit similar to one depicted on FIG. 7. On the alternatives, frames can be removed, and the variable resistance mechanism can be put into a more gadget like game controller.

Figure 13:
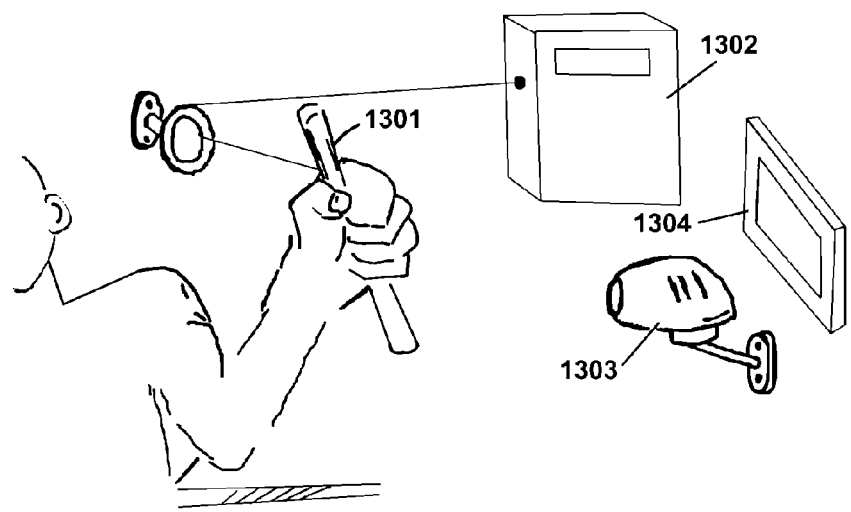
FIG. 13 is an illustration of online wrestling enabled by the invention.

The invention enables various physical exercise based activities, as can be illustrated by the example of remote or virtual online arm wrestling competition depicted on FIG. 13.

The arm wrestling competition requires two participants. Each participant places one arm, both put either the right or left, on a surface, with their elbows bent and touching the surface, and they grip handle 1301 connected by the cable to the exercise box 1302 connected through video gaming system and internet to the same kind of video gaming system and exercise box at other participant's location. The goal is to pin the other's arm onto the surface, with the winner's arm over the loser's arm. Each participant's position is observed by the web-cam 1303 and gets displayed on the TV monitor 1304. One can approximate the force a person is being able to apply during arm wrestling as a function of position, velocity, and time since the start of exercise. The arm wrestling exercise software on personal computer will provide several virtual opponents; each of them can be characterized by such a force function. During the virtual arm-wrestling, the user will select a partner and difficulty level. The software on video gaming system will receive from the controller current position and velocity, and using profile force curve and some random factor, calculate desired force and send it to the controller. The user technique (force, speed of the movement, posture, endurance, etc) is analyzed by the software and virtual coaching can be provided to improve user technique. The user force curve can be approximated from his exercise and such can become a part of user's online profile. This enables off-line virtual tournament, when software downloads another user's profile and use it as a virtual partner. In online tournament mode, two video gaming system exchange through internet current position, velocity, and force. The software is configured to adjust force simultaneously on 2 exercise boxes to synchronize position and velocity. Webcam is used to provide video link between 2 exercise partners.

It is beneficial to provide pose tracking into video game, physical exercise, or physiotherapy. Pose tracking is feasible with off the shelf methods and a higher resolution (2 mp or better) web camera. In the embodiment, fiduciary marks are imprinted on the handles of the controller to facilitate pose tracking. Further, user can wear ankle or wrist bands, or gloves with marks. Video gaming system recognizes the position of fiduciary marks using an open source ARToolKitPlus. Controller integrates data from the accelerometers and periodically transfers the integrated position and velocity to video gaming system The data are used to enhance the tracking precision. The software utilizes OpenCV motion tracking algorithms to combine the data from un-marked motion tracking, tracking of fiduciary marks, position data from the motor, and accelerometer data into single motion model. Intel integrated performance primitives library is used to facilitate image processing.

Figure 14:
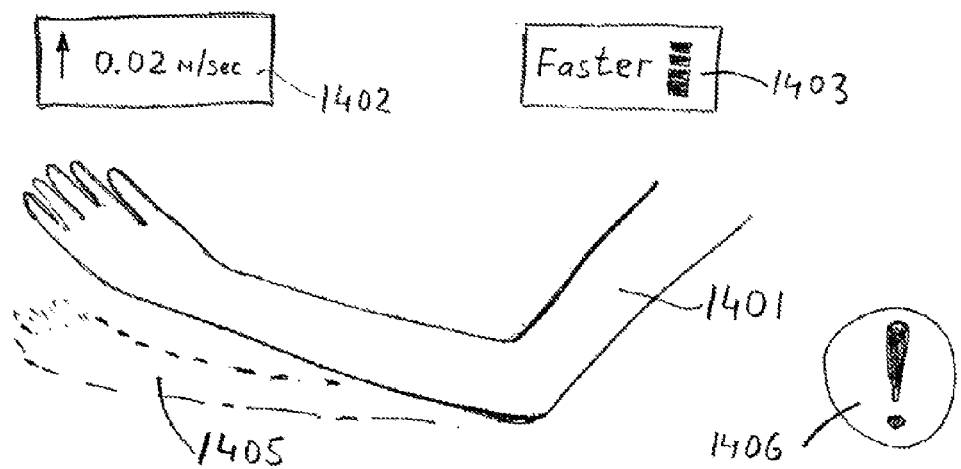
FIG. 14 is an exemplary layout of a screen during computer exercise or physiotherapy.

The system may be used to enable automated physiotherapy. Physiotherapist sets exercise parameters and observe initial session through web cam over Internet. During recovery after a dislocation, it is important to allow joint movement up to certain angle, and provide different resistance during eccentric and concentric phases. The software in video gaming system is configured to supervise users exercises and provide the controlled level resistance to the patient's hand movement at each stage of the exercise. During exercise, the software displays screen schematically shown on FIG. 14. The software displays computer generated model 1401 of the patient hand with posture adopted from the pose tracking modules. The software displays current velocity 1402 and visual guidance (faster/slower/good) 1403 to the user. The software also displays therapeutic limit 1405 for the user and provide audio/visual warning 1406 in the case the limit is approached. The user progress is stored as a part of online profile. Resistance is provided by the exercise box described on FIG. 3. Physiotherapist periodically performs review of patent's online profile and modifies parameters.

Figure 15:
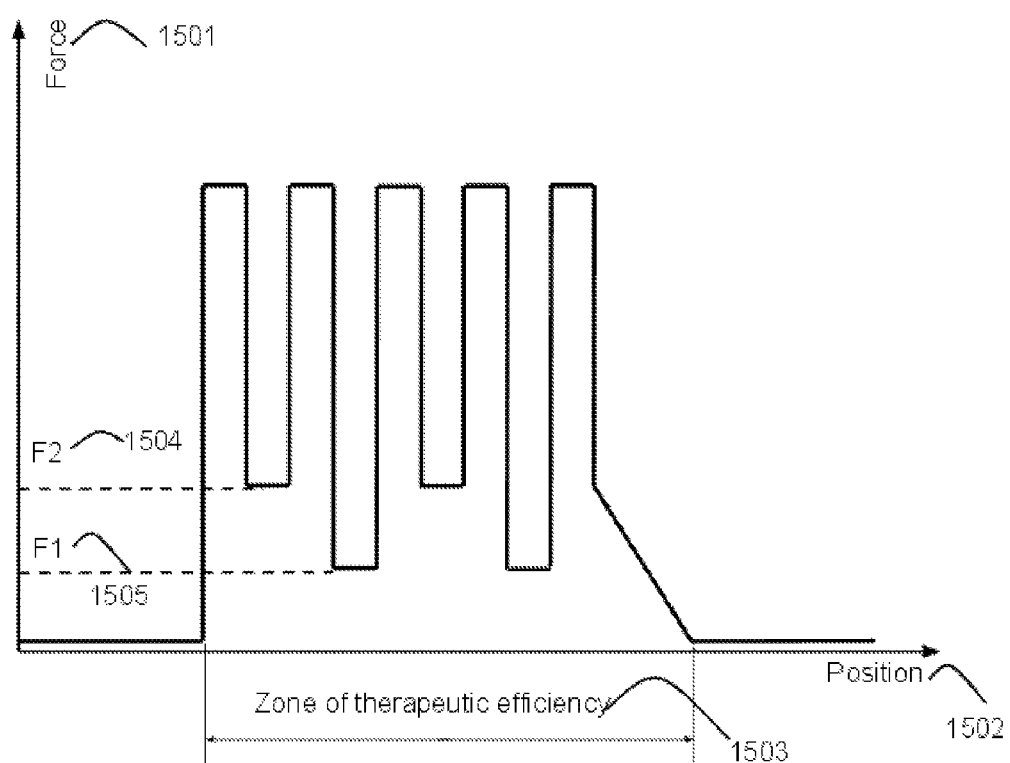
FIGS. 15-16 depict exemplary position/force magnitude curves ("force curve") for a strengthening exercise that provide massage of the toned muscle by varying of the force magnitude.
Figure 16:
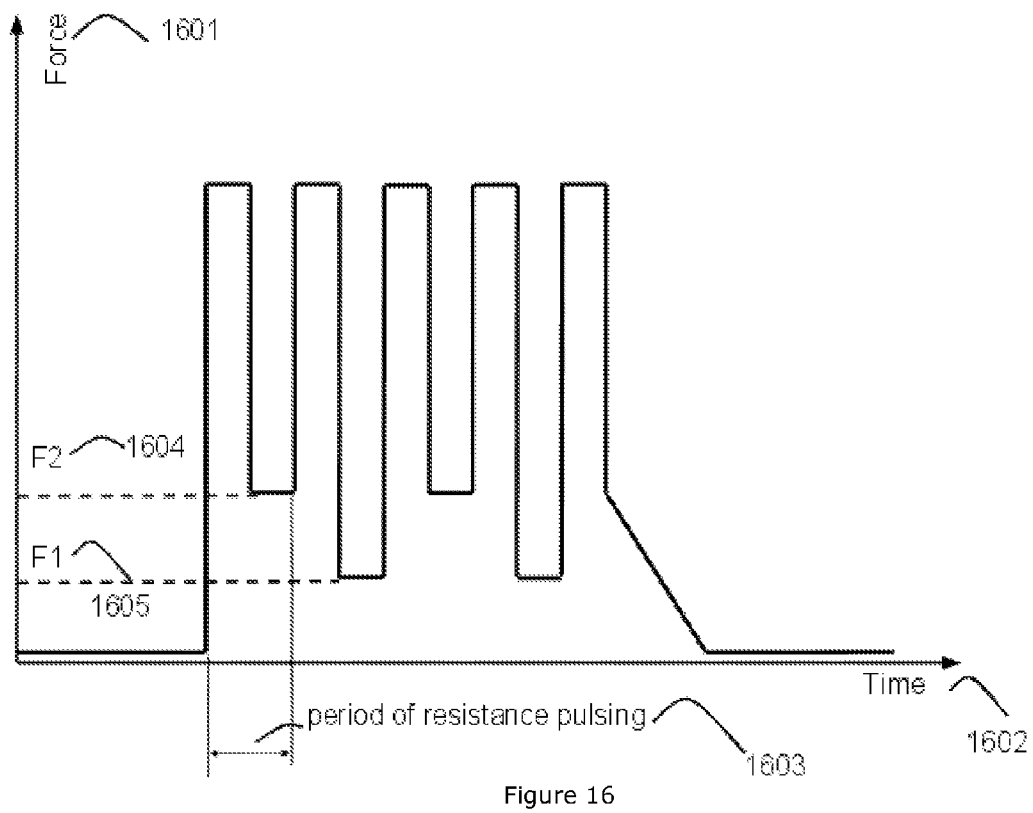

There is research claiming that vibrating the resistance during exercise substantially increases exercise efficiency and has physio-therapeutical effect The invention can easily provide such an exercise regime. Further, because the invention tracks the use posture and exercise speed, the vibrating regime can be optimized depending on those parameters. FIGS. 15 and 16 show example of manipulation of exercise resistance force's magnitude. FIG. 15 shows an exemplary plot of the force as a function of position, while FIG. 16 as a function of time.

Many of the known video games use a video camera (such as a combination of visible light and infrared video camera as provided in Microsoft Kinect) to track users posture. The invention advantageously uses video camera to recognize exercise device used by the user (or available to be used in a view of the video camera), as well as the current setting of the exercise device. This information is advantageously used to record the history of exercise regime, adjust prompts given to the user by the exercise system, and to plan exercise regime. In an embodiment, the exercise devices contains markers to facilitate the recognition. In some embodiments of the invention, the markers are available for sales and can be attached to pre-existing exercise devices. In other embodiments, the invention is compatible only with a limited number of exercise devices with pre-manufactured markers, those enabling lock-in of the costumer and more profits. It is apparent to one ordinary skilled in the art that more business methods falls within the scope of invention.

Figure 17:
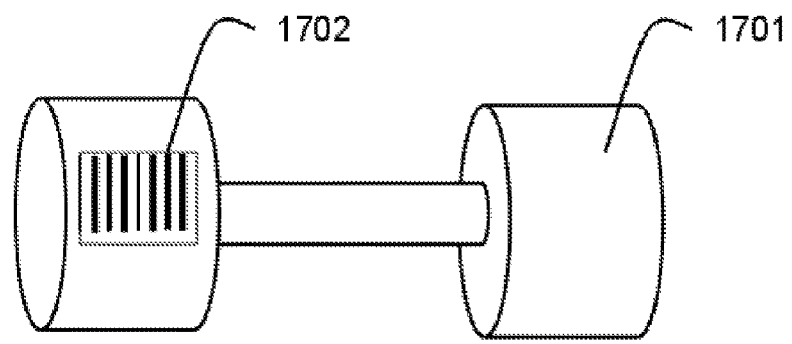
FIG. 17 depicts a dumbbell with barcode to facilitate weight recognition by a video camera equipped video gaming system.

FIG. 17 shows a dumbbell with a barcode 1702. It is apparent to one ordinary skilled in the art different kind of markers, such as 2D barcode, color codes, etc can be practiced within the scope of the invention.

Figure 18:
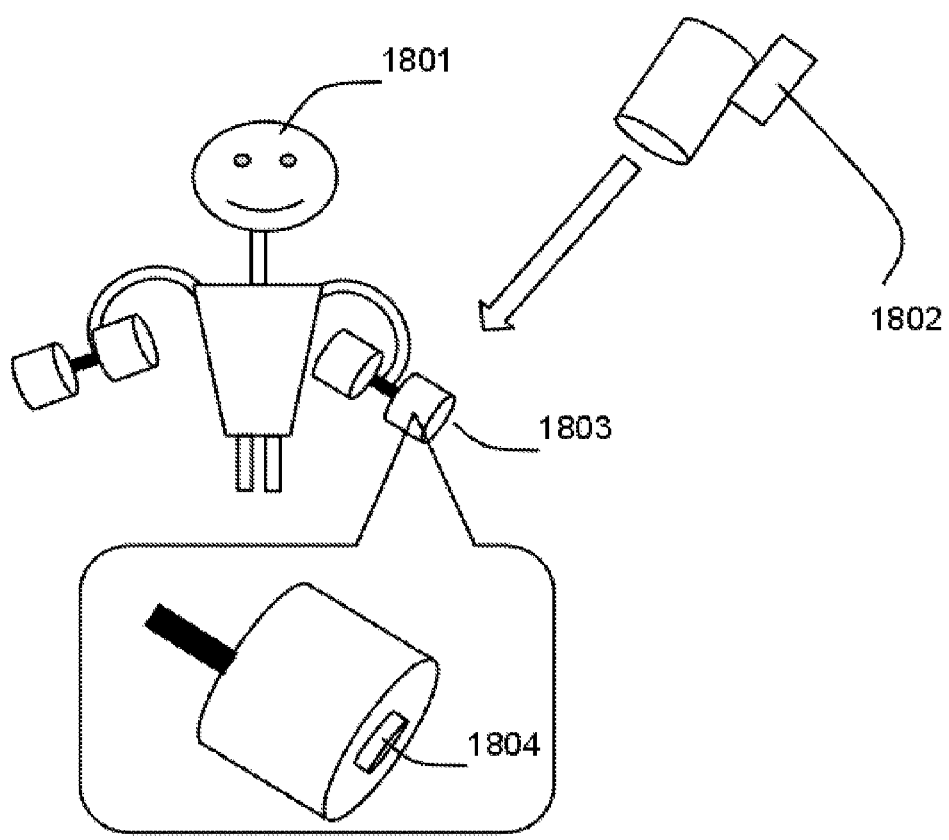
FIG. 18 depicts user exercising with dumbbells while video camera coupled with a video gaming system tracks user posture and recognizes dumbbell weight based on the object of known size.
Figure 19:
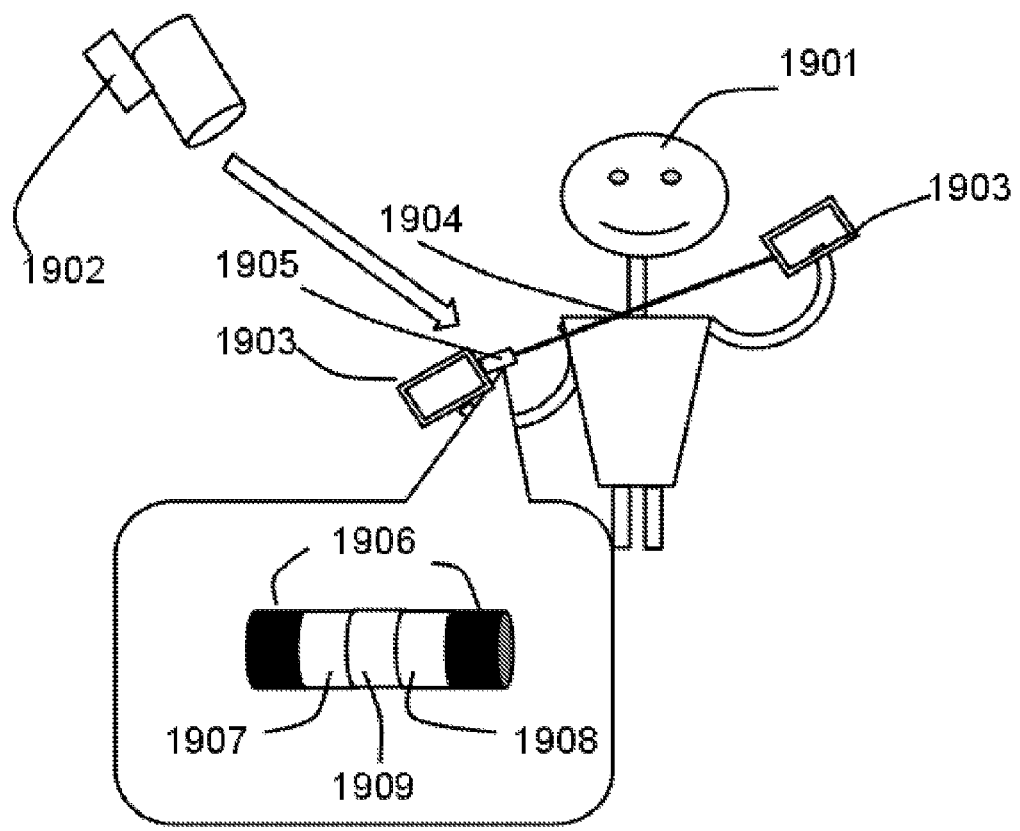
FIG. 19 depicts user exercising with resistance bands, where resistance is recognized using color coded objects.

FIG. 18 shows user exercising with an ordinary dumbbells. The system registering the dumbbells by allowing user to demonstrate them and record the corresponding weight. The system remembers the relative sizes of the object with known size (1804) and the adjustable weights, that enables to recognize the currently installed weight.

Figure 20:
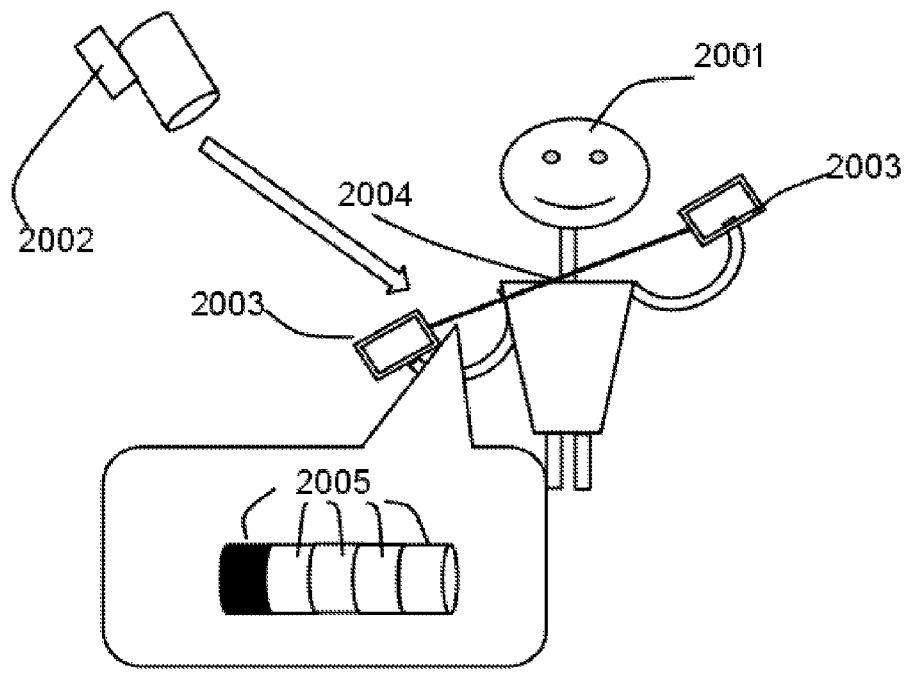
FIG. 20 depicts user exercising with resistance bands, while the resistance level is recognized using color coded bands.

FIG. 20 shows user exercising with an exercise band with replaceable resistance bands. In an embodiment, each replaceable band is equipped with a marker, having two high contract black ends 1906 and color coded pieces 1907-1909 in between. In an embodiment, the video gaming system is configured by software to recognize the current resistance using computer vision techniques. For example, when the exercising with rubber bands, pose tracking information could be used to identify the current length of the rubber band. In an embodiment, the rubber band has high contrast object or markings on it, facilitating the recognition of the current resistance level.

Figure 21:
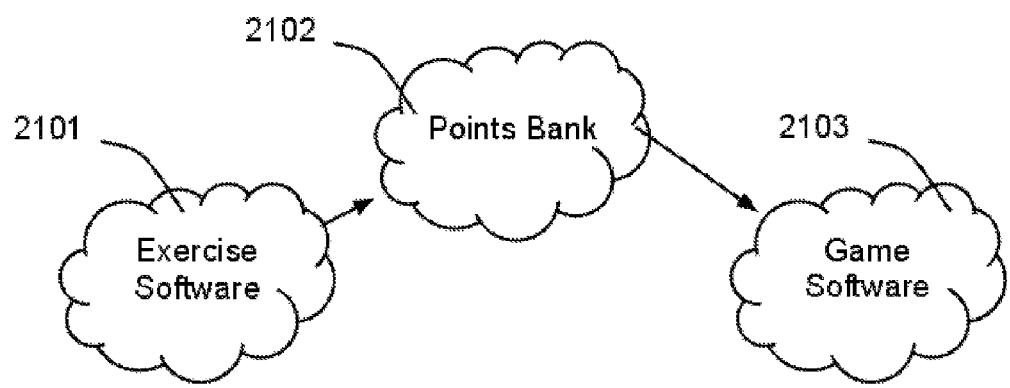
FIG. 21 depicts architecture to use points collected during exercise activity to control entertaining games.
Figure 22:
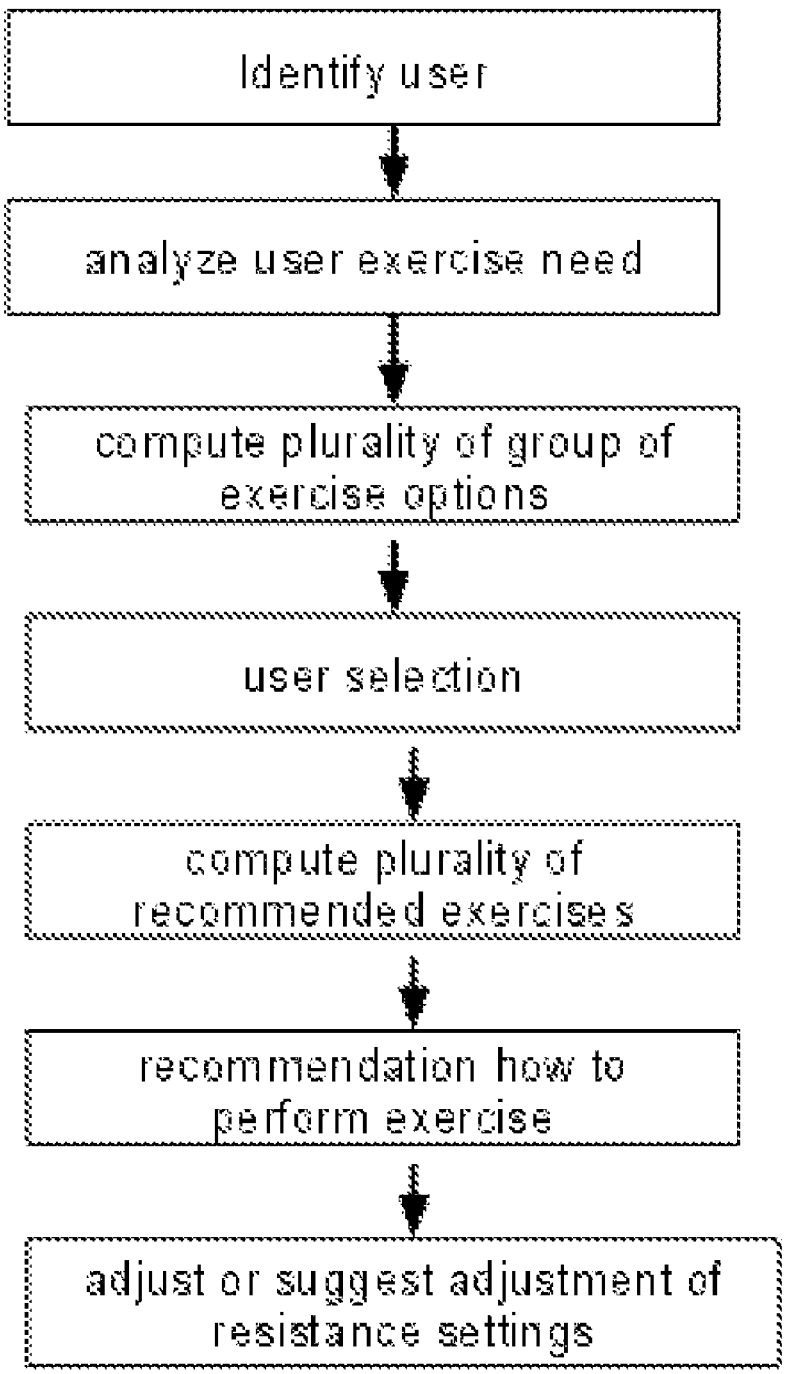
FIG. 22 is a flow of strength training exercise coaching by a processor of a video gaming system
Figure 23:
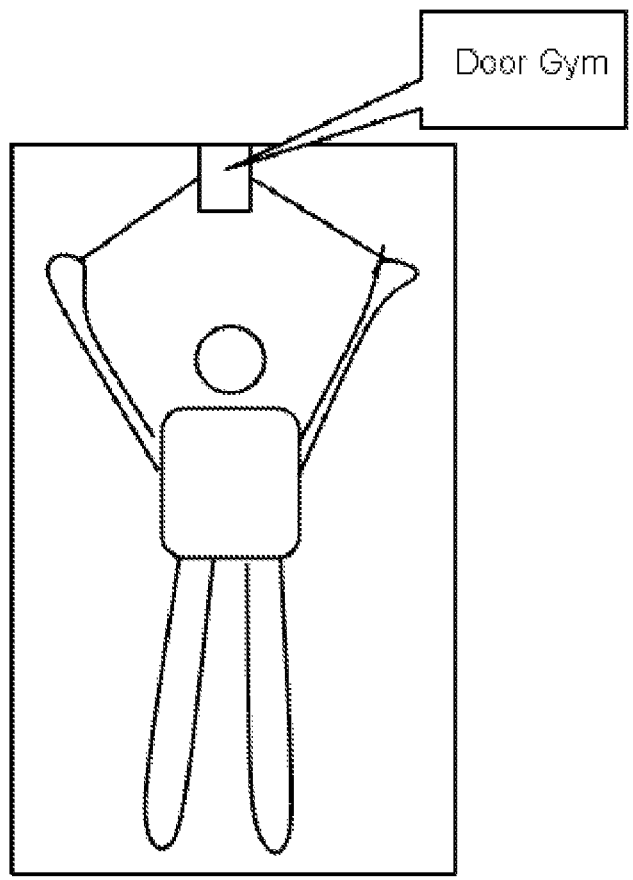
FIG. 23 depicts a user exercising with a door gym
Figure 24:
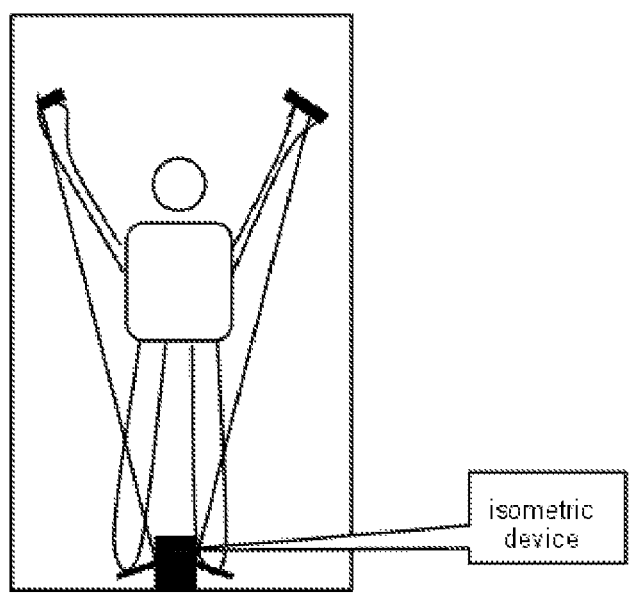
FIG. 24 depicts a user exercising with an isometric device
Figure 25:
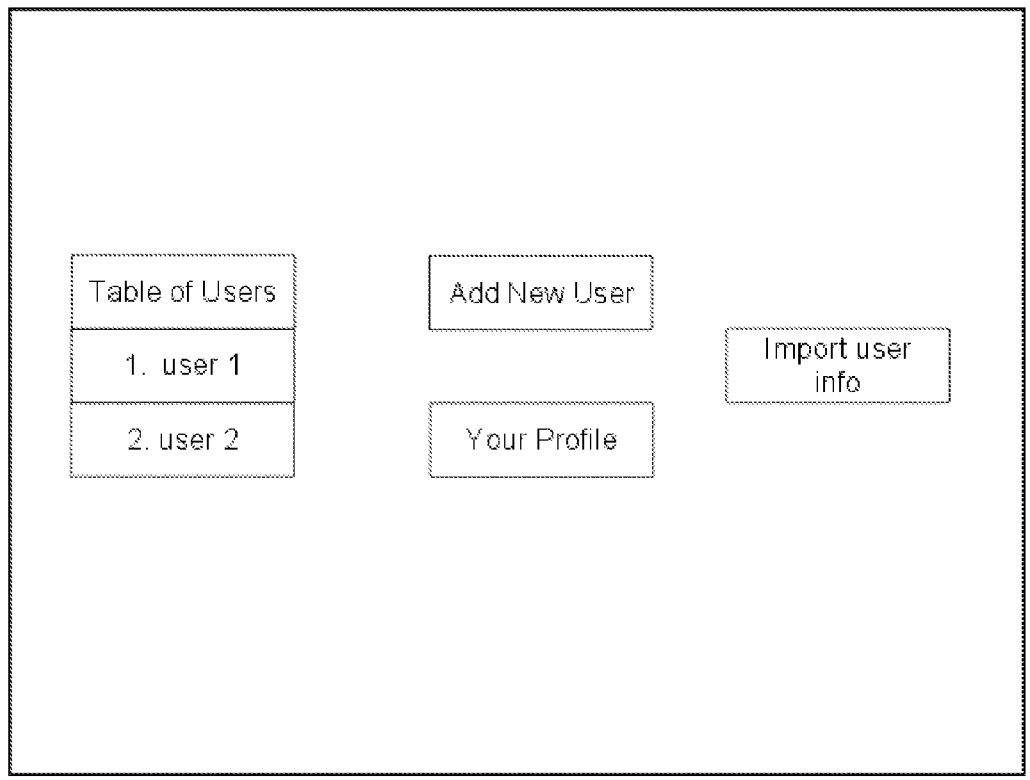
FIG. 25 depicts an exemplary screen of a video gaming system used to identify a user.
Figure 26:
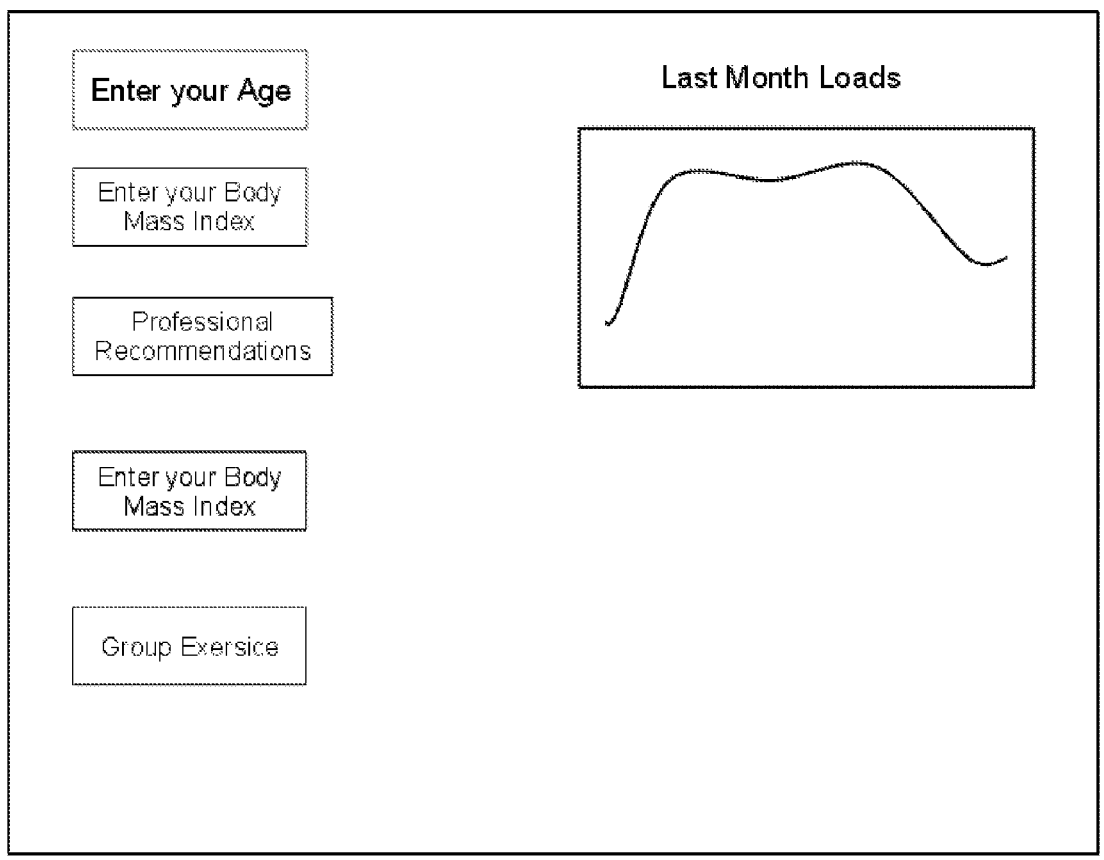
FIG. 26 depicts and exemplary screen of a video gaming system used to analyze user exercise needs.
Figure 27:
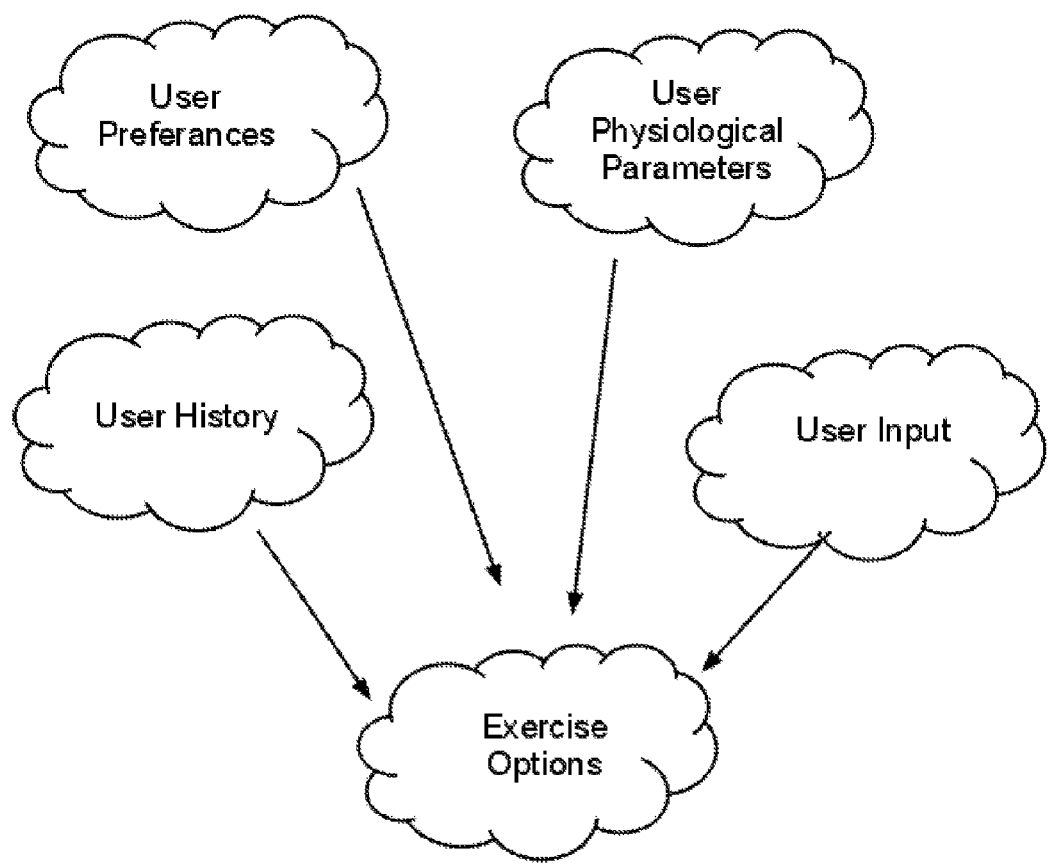
FIG. 27 illustrates dataflow that could be used to compute plurality of exercise options and generate an audio or video signal prompting user to exercise.
Figure 28:
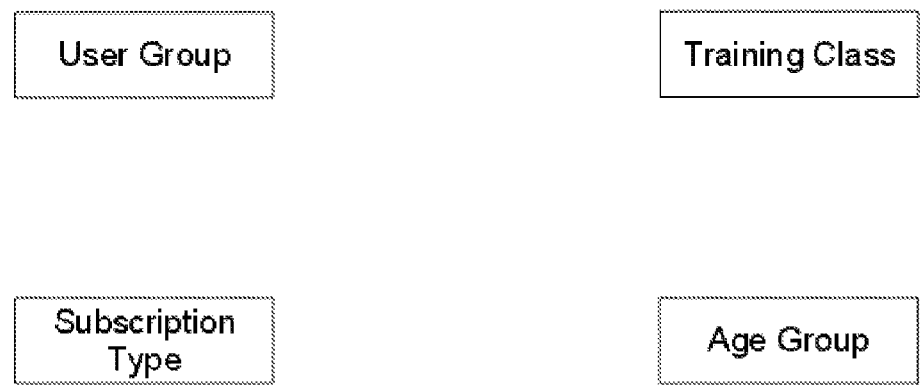
FIG. 28 depicts an exemplary screen of a video gaming system used to identify a user.
Figure 29:
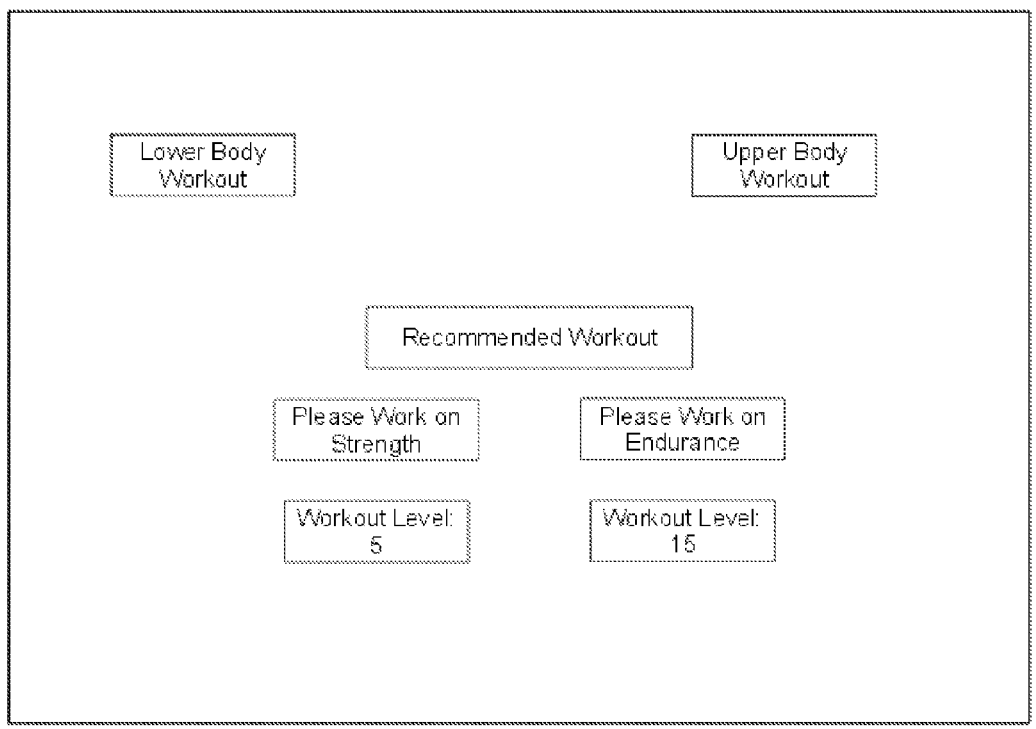
FIG. 29 depicts an exemplary screen used by a video gaming system to suggest an exercise.
Figure 30:
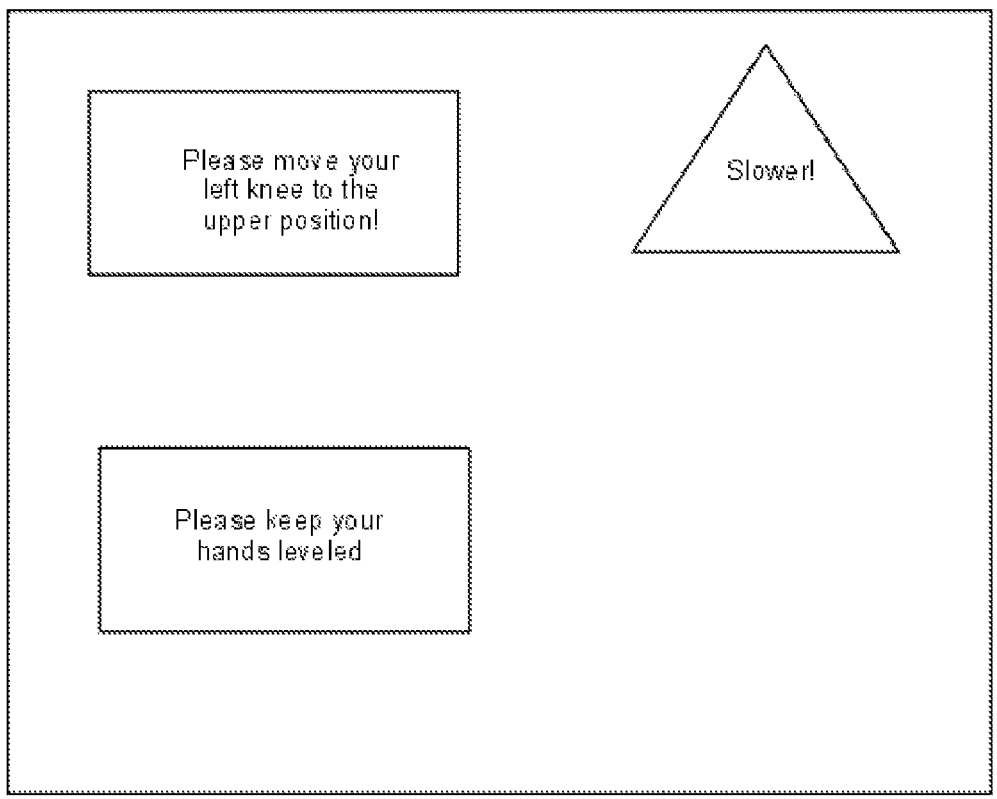
FIG. 30 depicts an exemplary screen used by a video gaming system to coach user to improve exercise technique.
Figure 31:
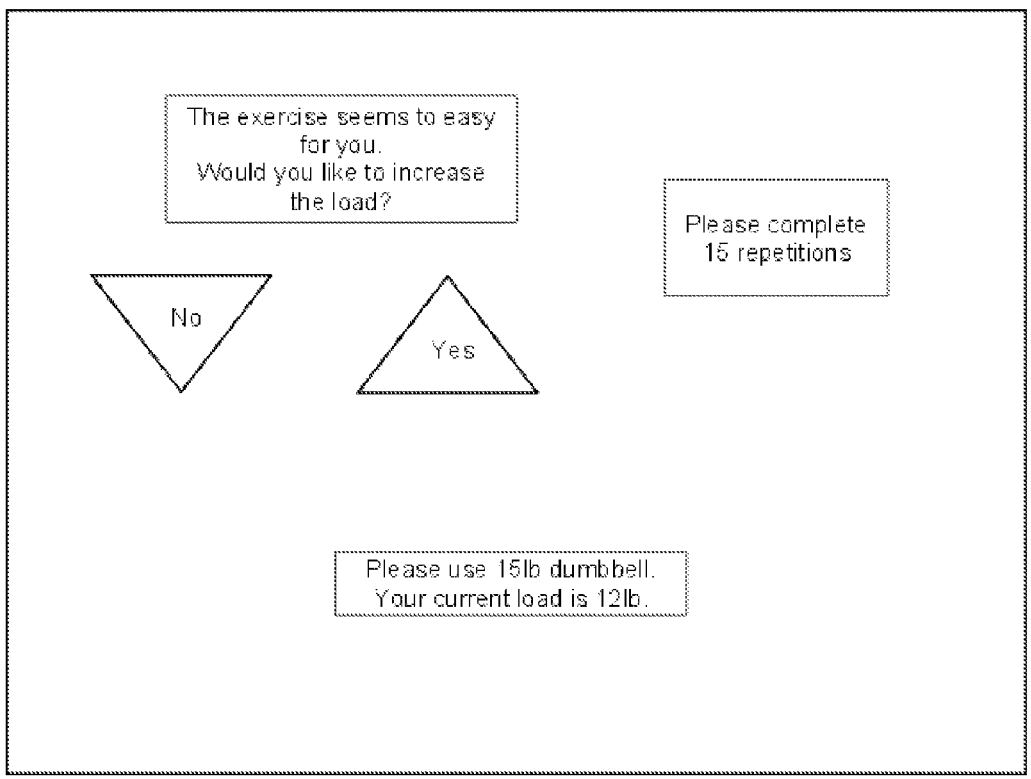
FIG. 31 depicts and exemplary screen used by a video gaming system to suggest the user to change the resistance.
Figure 32:
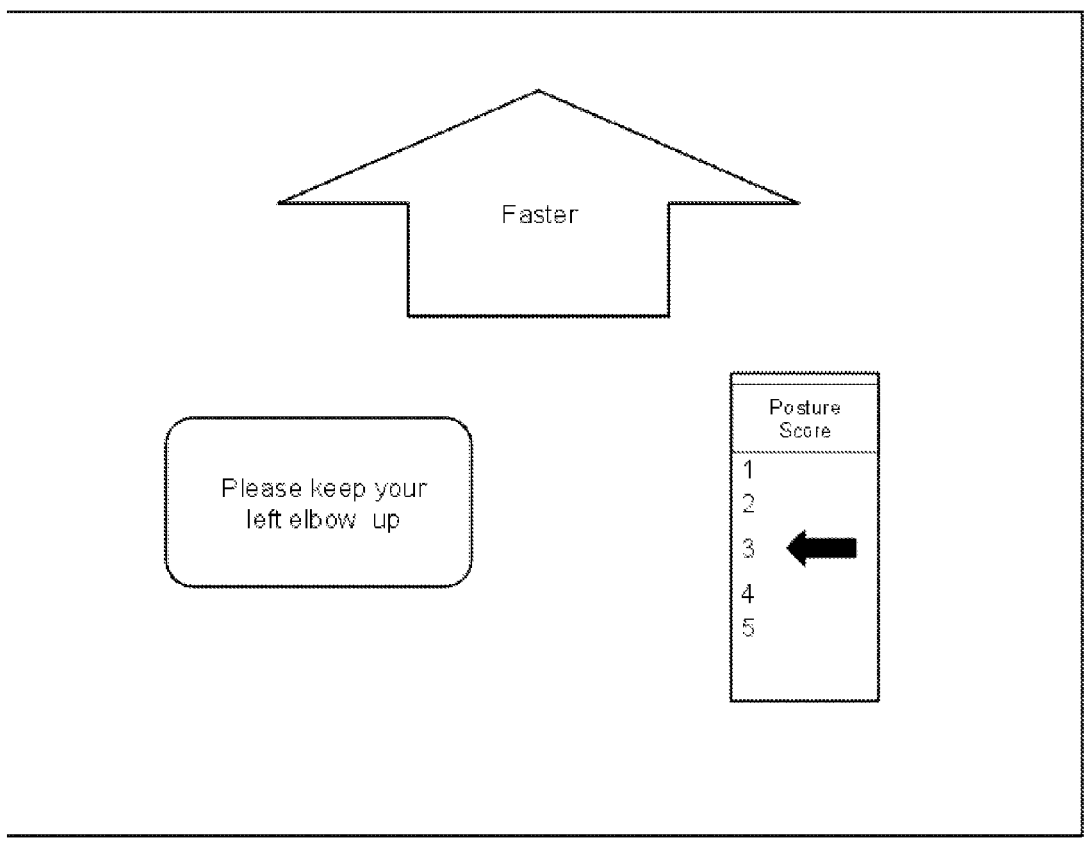
FIG. 32 depicts an exemplary screen used by a video gaming system to coach user to improve exercise technique.
Figure 33:
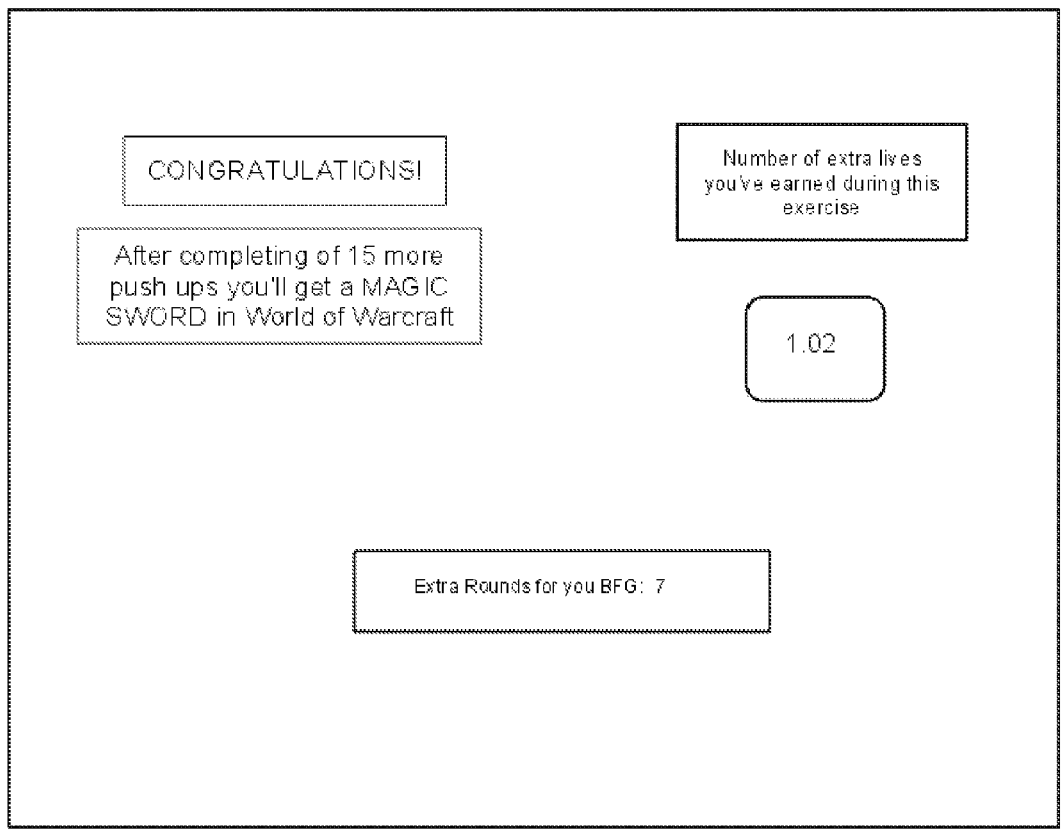
FIG. 33 depicts an exemplary screen used by a video gaming system to inform user that he earned entertaining activity by exercising.
Figure 34:
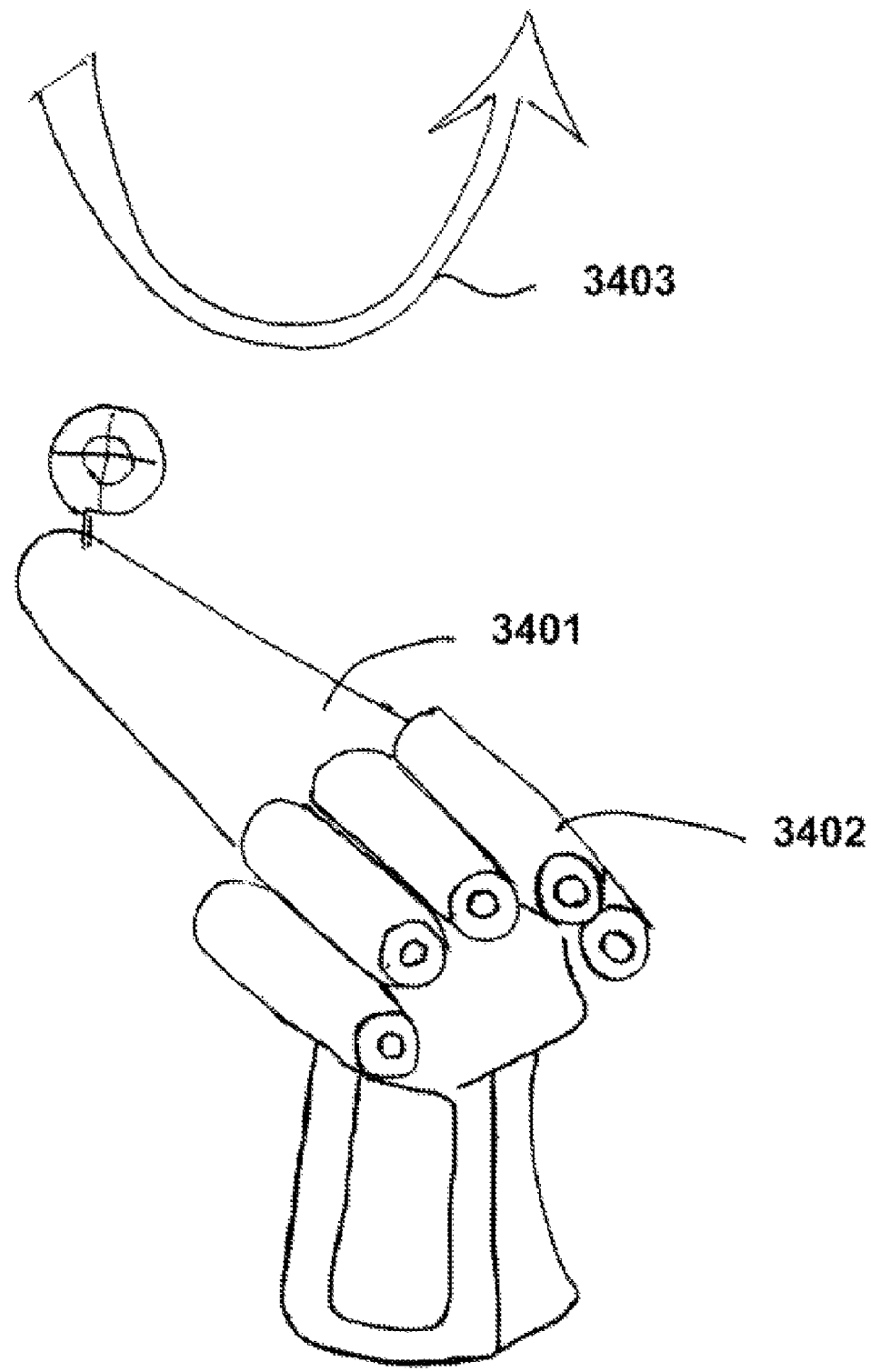
FIG. 34 depicts and exemplary game artifact earned by exercise.

FIG. 21 shows an exemplary architecture to communicate between exercise software 2101 and gaming or entertaining software 2103. In an embodiment, by achieving exercise goals, such as time or intensity of exercise, or upon reaching a milestone (ten push-ups), user earns a number of points. The points then can be used by entertaining software to buy time (e.g., a teenager can watch his favorite series only after exercising for half hour) or access to premium content (e.g., a teenager can got access to R-rated movie or premium weapon or money in virtual reality game).

Figure 35:
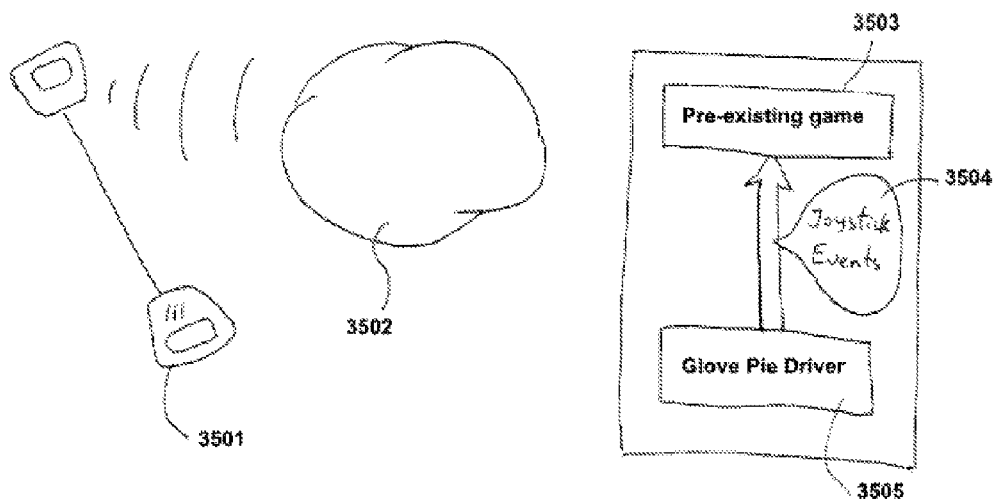
FIG. 35 depicts an exemplary architecture used to control legacy video games by strength training exercise.

FIG. 35 shown an architecture to enable control of a conventional game or an application using exercise equipment. The muscle training controller supports HID profile 3502. A software utility called GlovePIE 3505 is installed on a PC. The utility is configure to translate muscle training events (e.g., movement of exercise device or handle) into joystick, or mouse and keyboard events 3504. Conventional game or application 3503 receives translated events.

Figure 36:
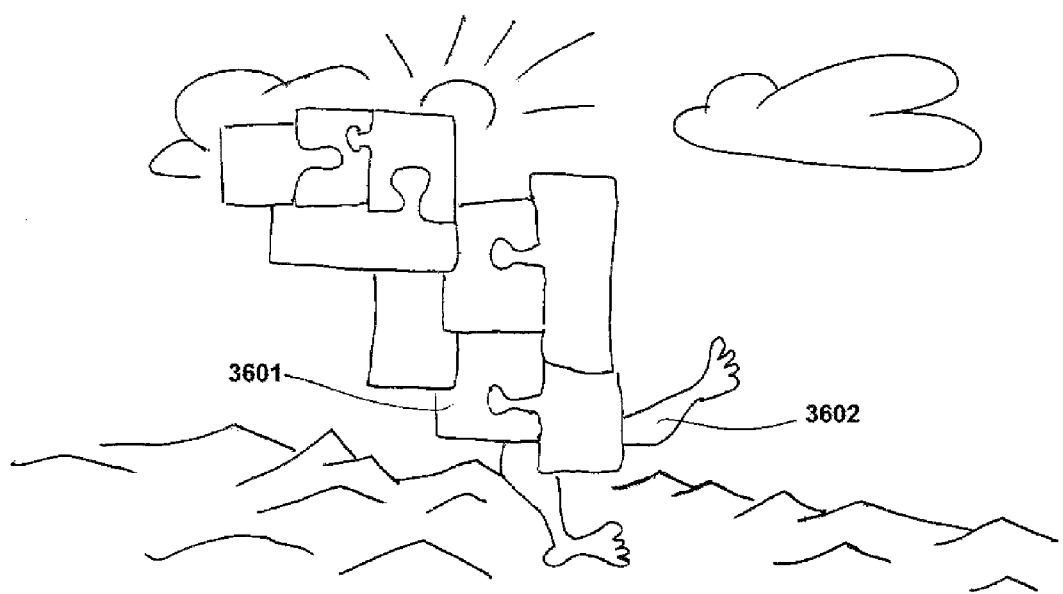
FIG. 36 depicts an exemplary video stream attractive to a male user that is obscured and can be unlocked by exercising.
Figure 37:
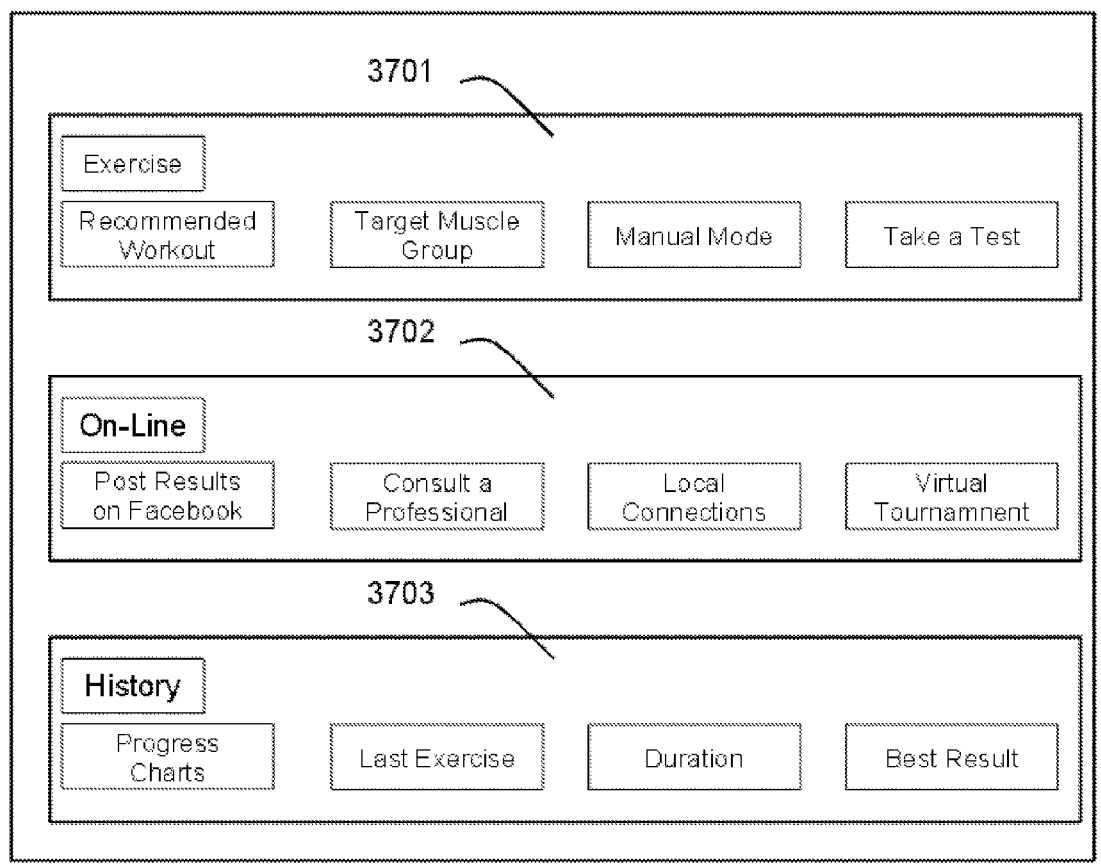
FIGS. 37-40 shows screens of a video game during exercise games.
Figure 38:
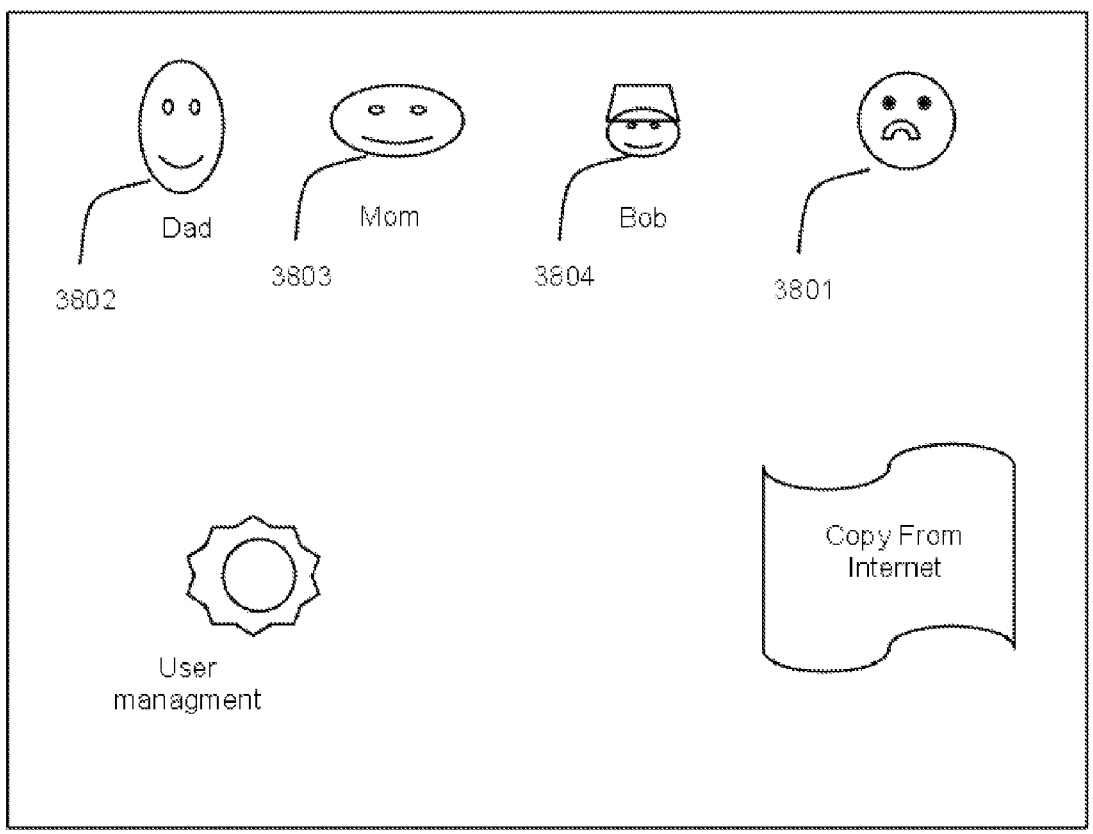

FIG. 36 illustrates the concept of audio and visual reinforcement of an exercise. During the exercise, at least a portion of the VGS screen displays an attractive to the user picture 3602. However, at least a portion of a picture is hidden by an obstructive image 3601. The obstructive image is removed as user progresses on exercise. One skilled in the art would understand that this concept can be used for static images, videos, and audio. For example, a user may elect to be required to exercise during a football match. If intensity of the exercise is not on track, the image will became blurred or obscured. The user will have to be back on track to the see the image. On the alternative, the user might be watching a movie and a particularly interesting for a user moment will be approaching. User will be required to push really hard to see the most interesting scene. It is apparent to once ordinary skilled in the art that instead of obscuring the video, one may just pause it for a time.

Figure 39:
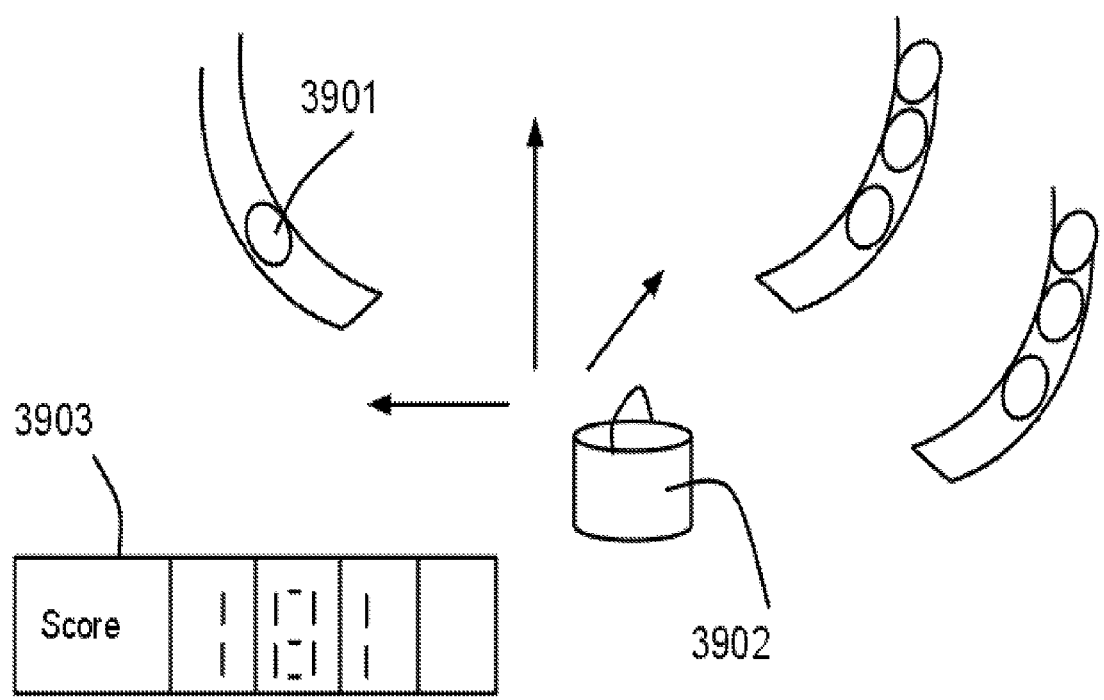
Figure 40:
Figure 41:
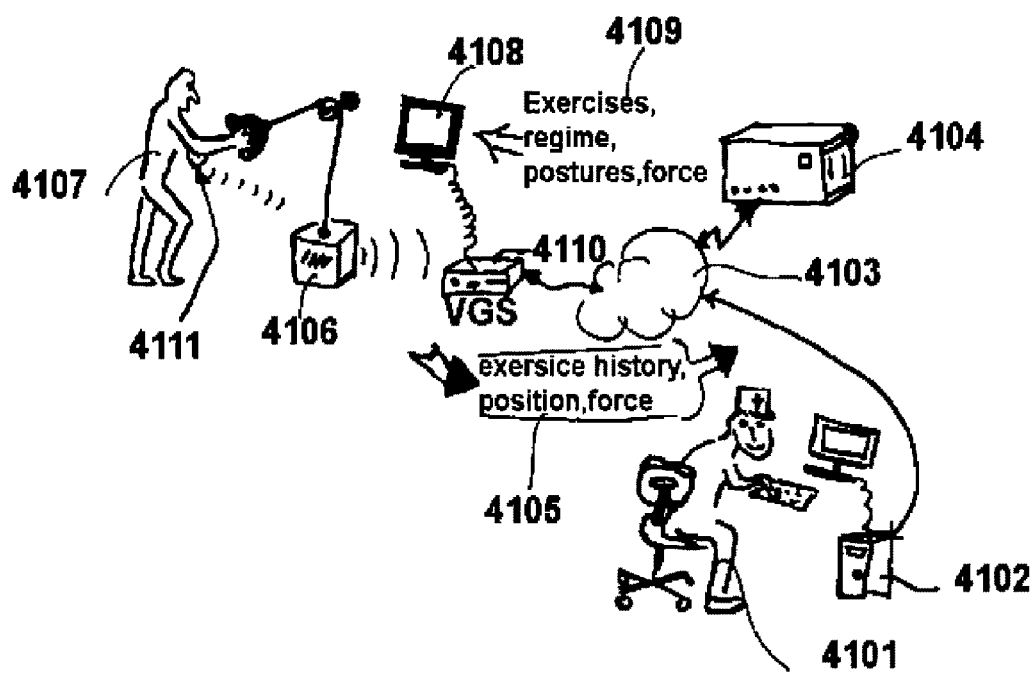
FIG. 41 shows an architecture that can be used to enable an exercise professional to monitor or adjust exercise regime provided by the invention.
Figure 42:
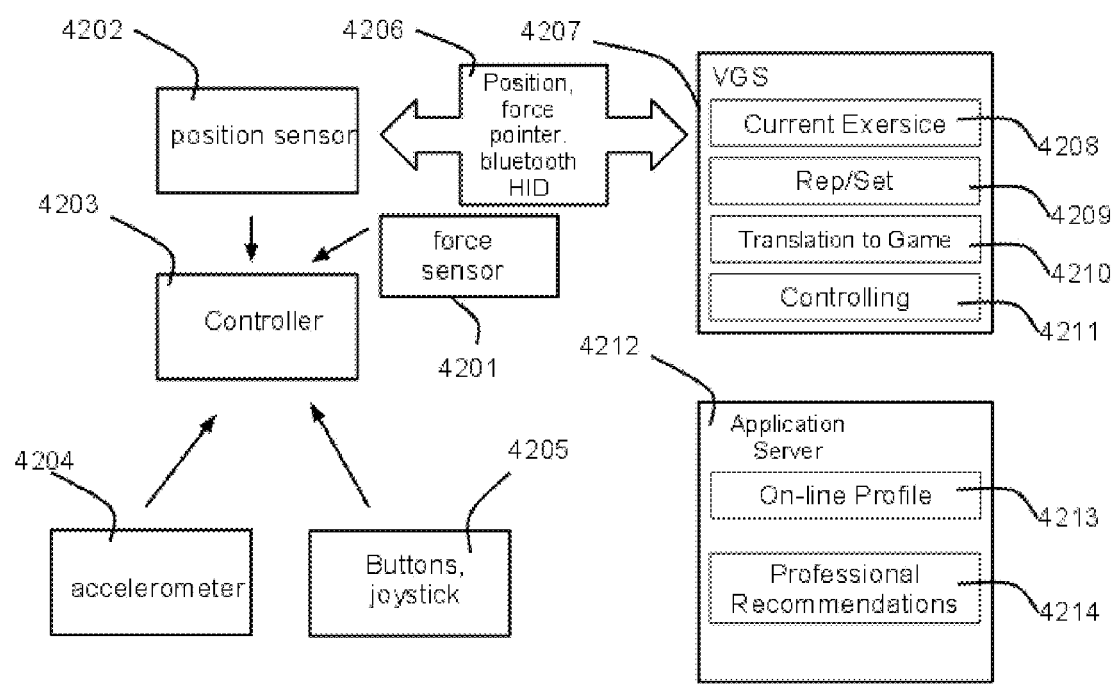
FIG. 42 shows data architecture.
Figure 43:
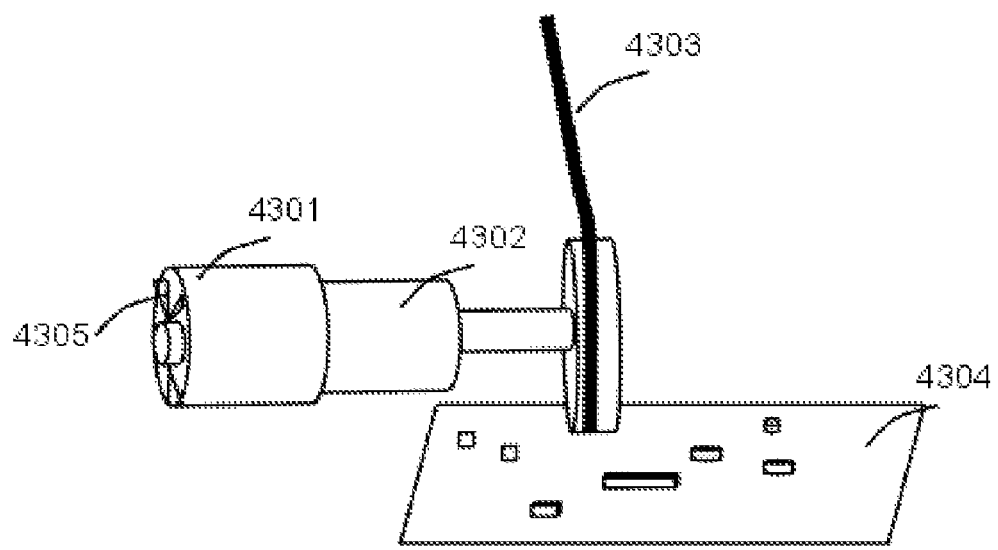
FIG. 43 shows an implementation of a semi-stationary unit where resistance is provided by electrical motor.
Figure 44:
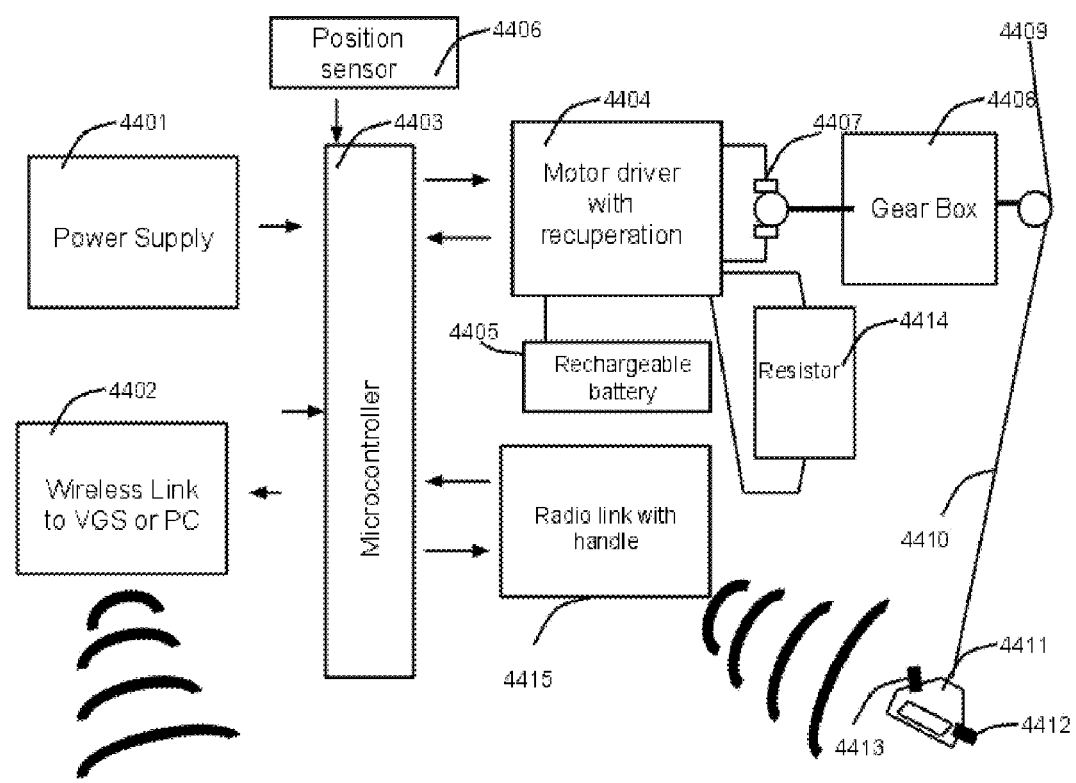
FIG. 44 depicts a schematic diagram providing electrical recuperation in rechargeable battery and/or super-capacitor.
Figure 45:
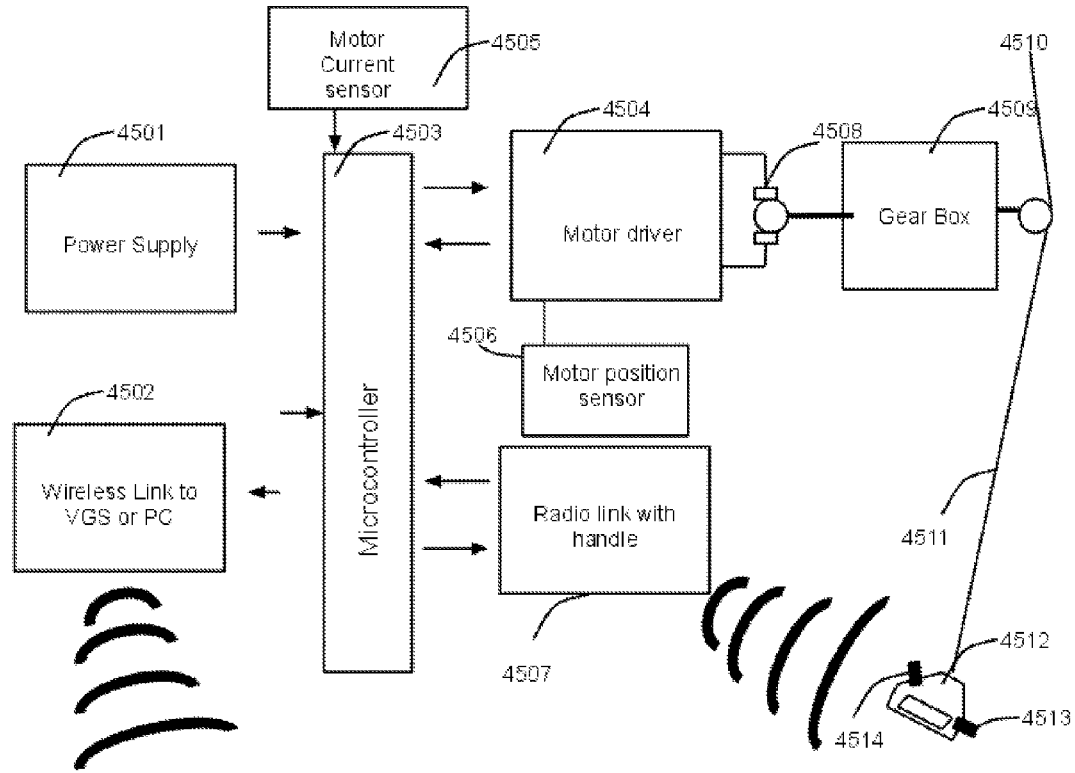
FIG. 45 depicts a schematic diagram without electrical recuperation.
Figure 46:
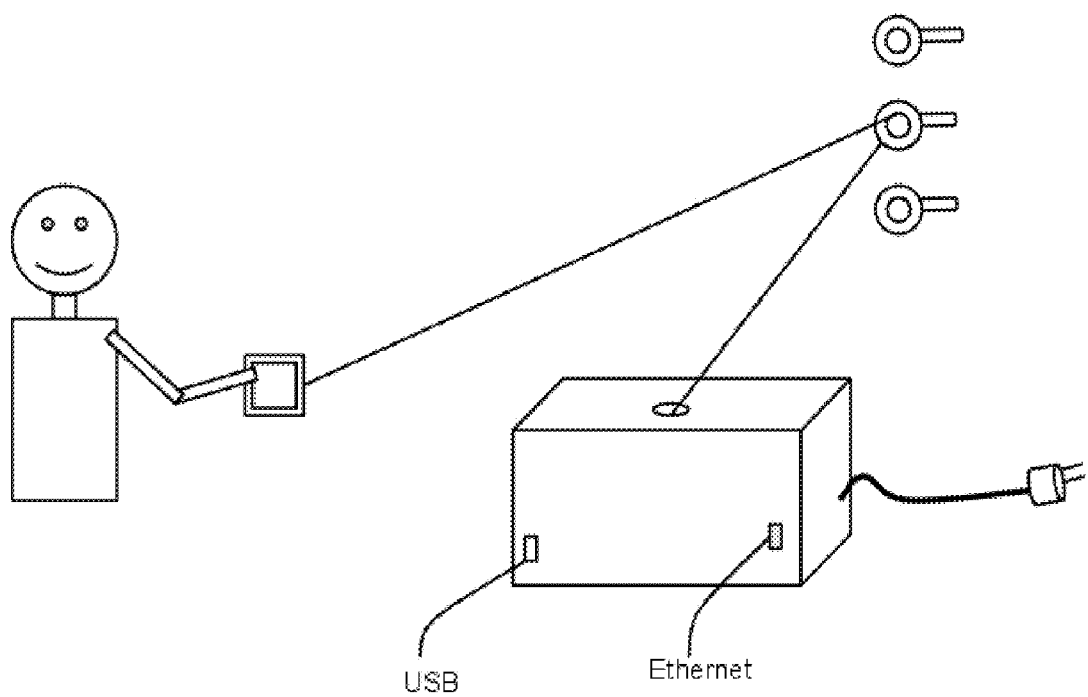
FIG. 46 shows an implementation of a semi-stationary unit where resistance is provided by electrical motor.
Figure 47:
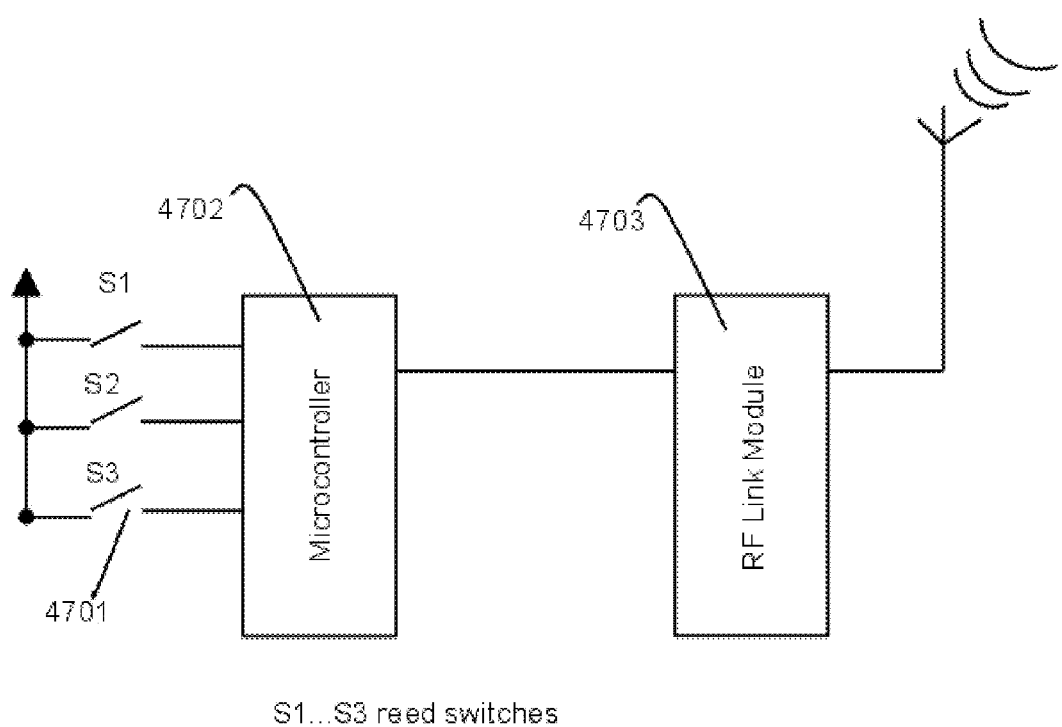
FIG. 47 shows electrical diagram of the pulley assembly.
Figure 48:
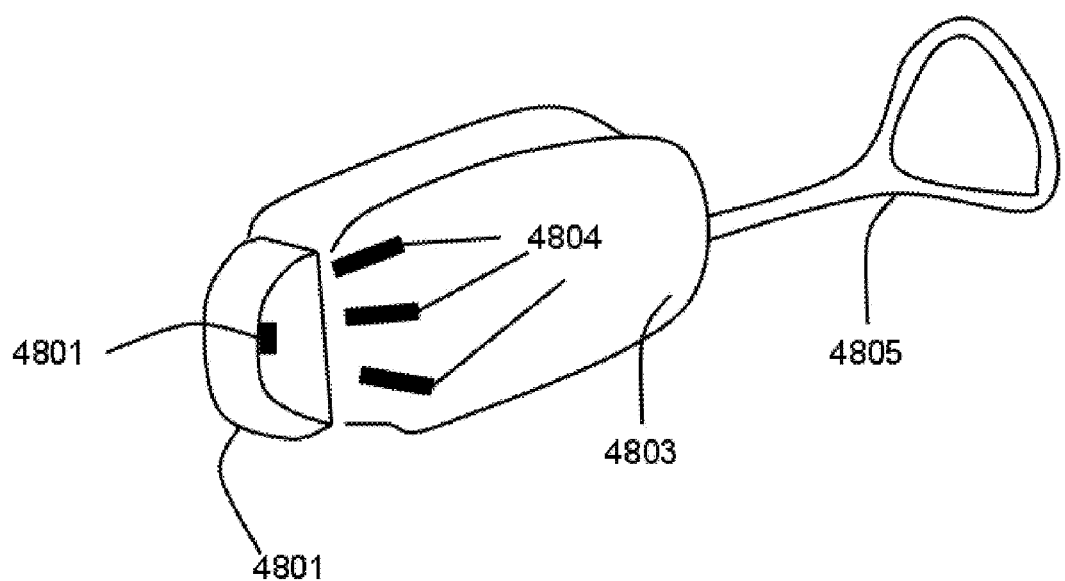
FIG. 48 shows block with pulley and position sensor.

FIG. 39 depicts an exemplary screen of a video game. The goal of the game is to collect as many as possible eggs 3901 into bucket 3902. The eggs are falling down. The game can be controlled using a controller depicted on FIG. 49. By moving handles left and right, the bucket can be moved accordingly. By applying greater force at the handles, the player can increase the speed the bucket can move on the screen, or directly earn points.

Figure 49:
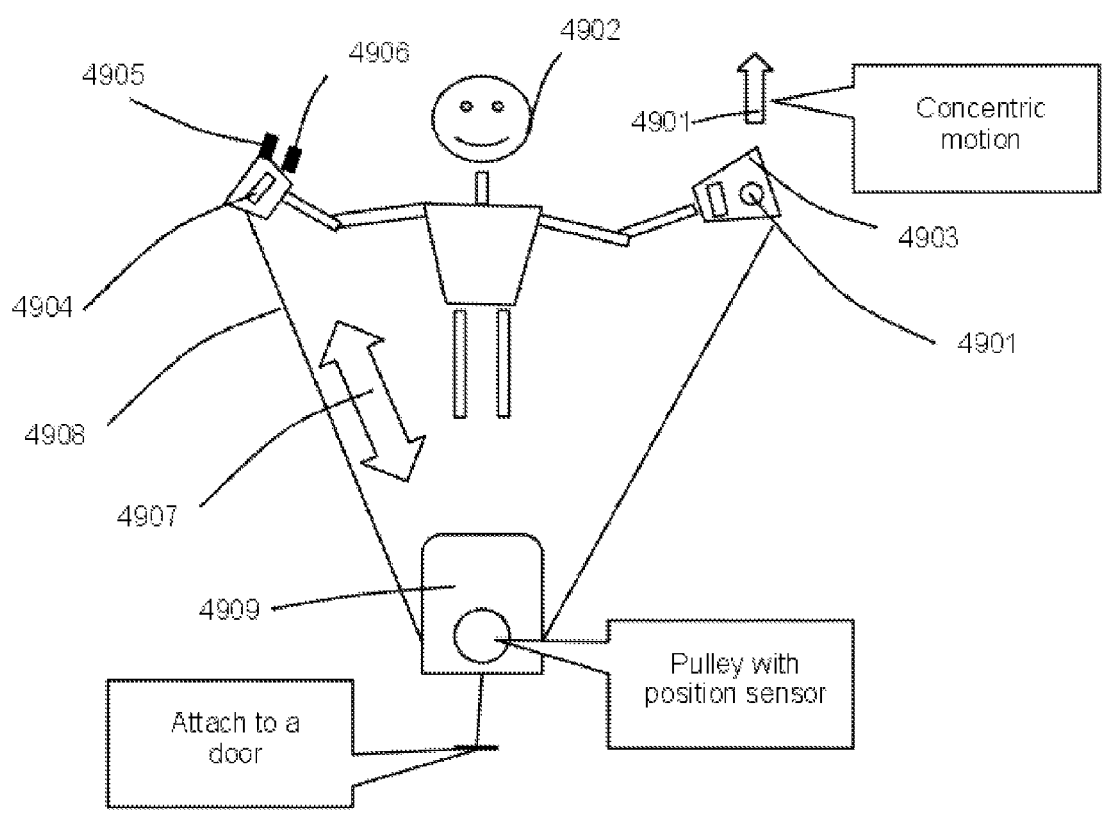
FIG. 49 shows wireless game controller, where resistance is provided by simultaneous eccentric and concentric motion.
Figure 50:
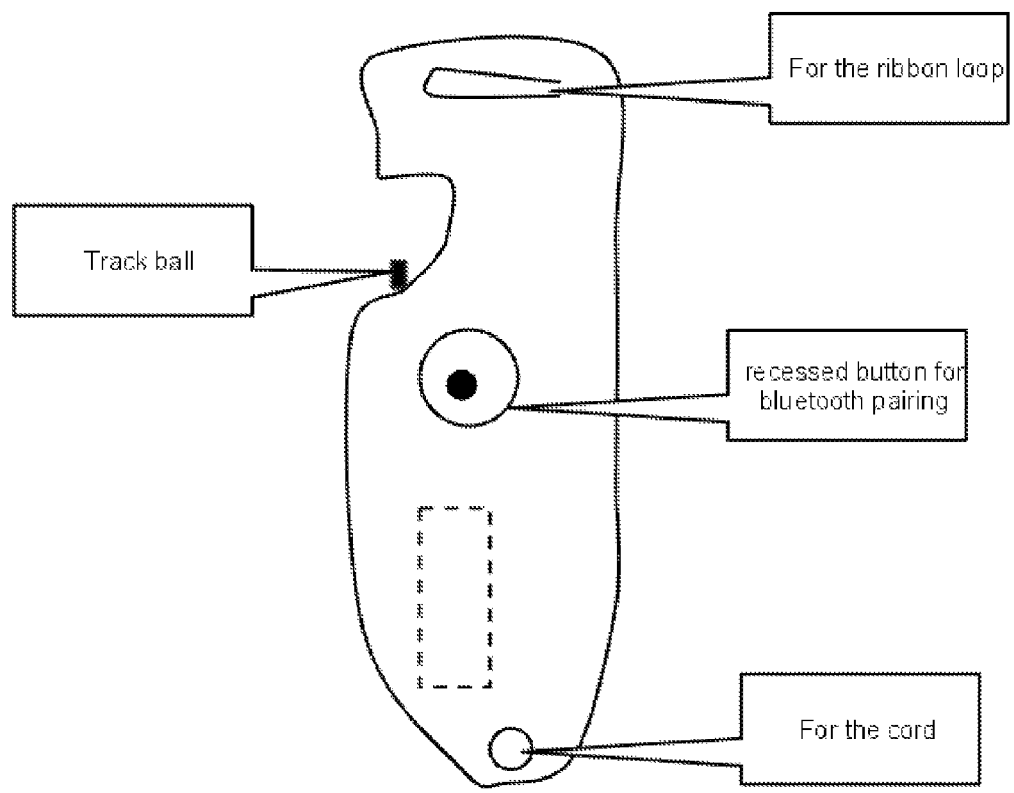
FIG. 50 shows an exemplary form factor for controller handle.
Figure 51:
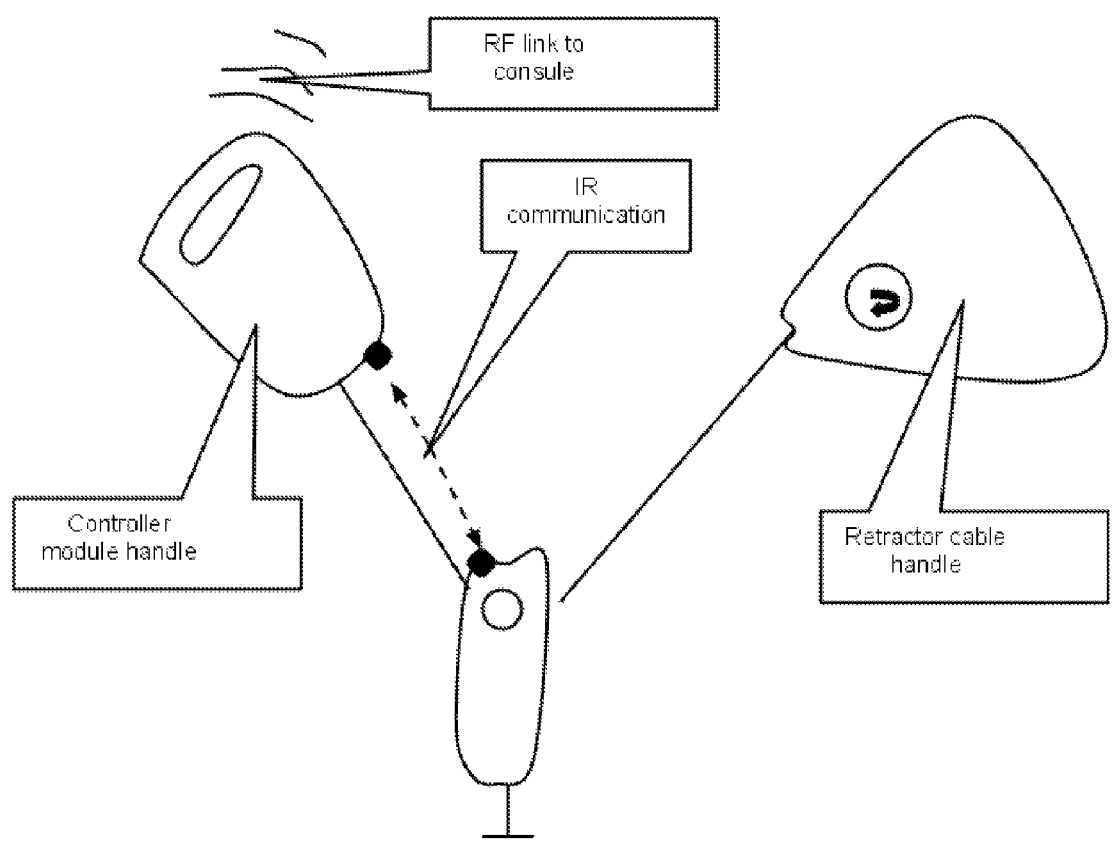
FIGS. 51-52 shows an exemplary form factor for a controller.
Figure 52:
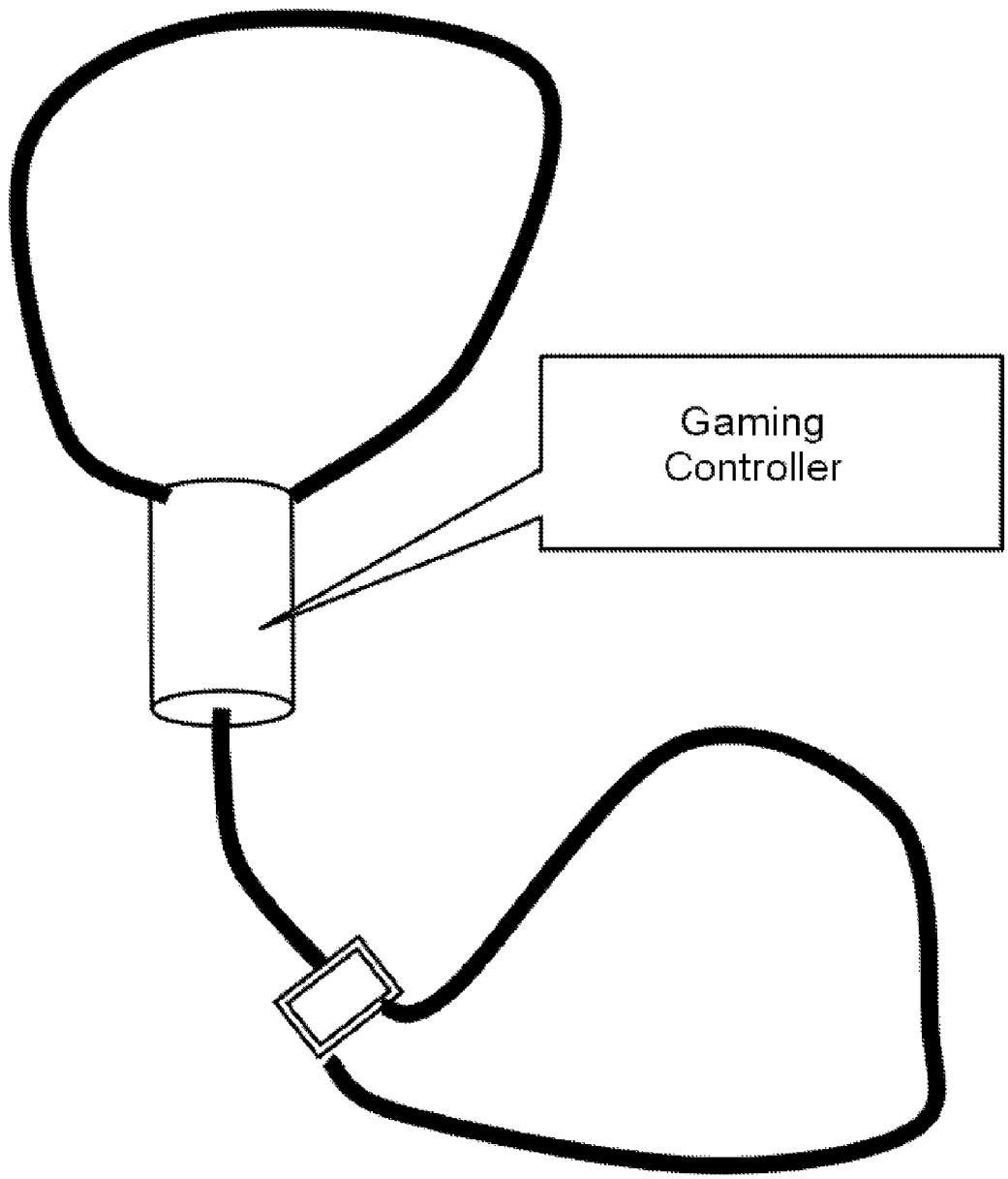
Figure 53:
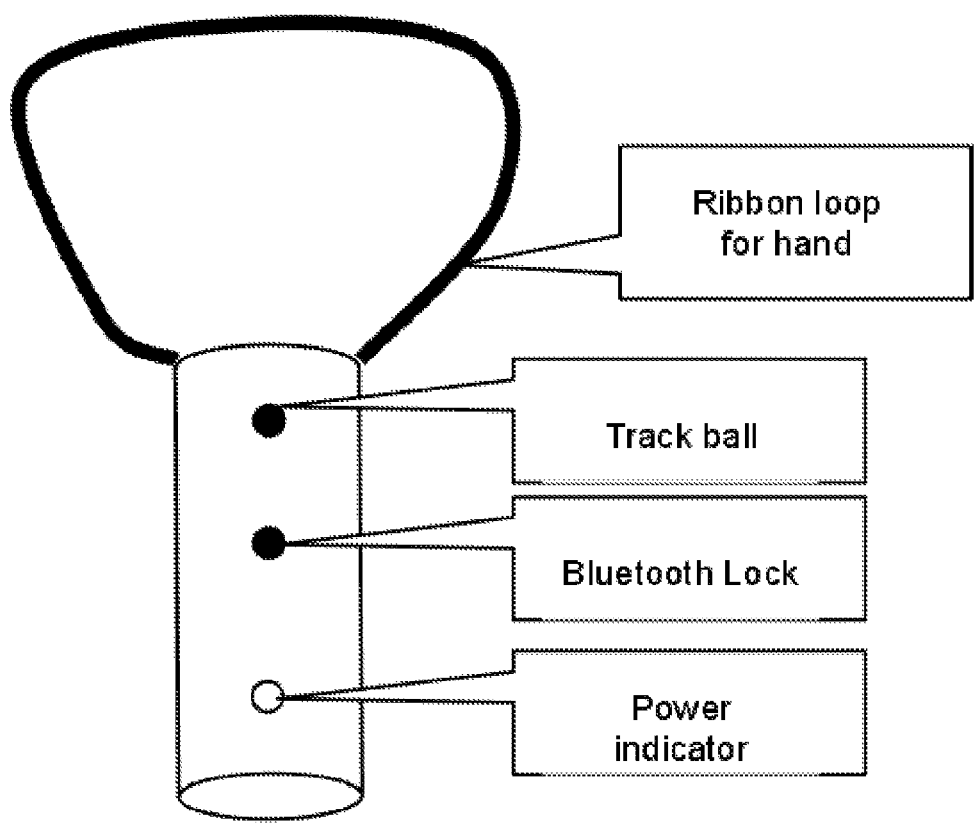
FIG. 53 shows an exemplary form factor for controller handle.
Figure 54:
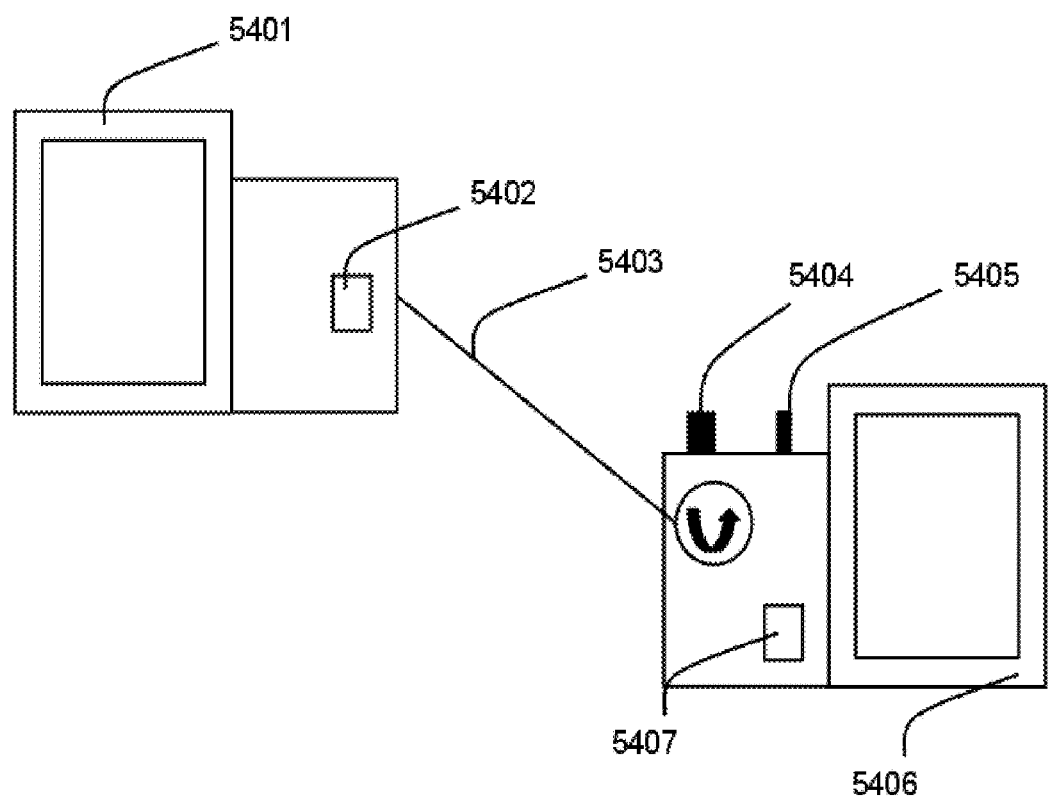
FIG. 54 shows an exemplary form factor for a controller.
Figure 55:
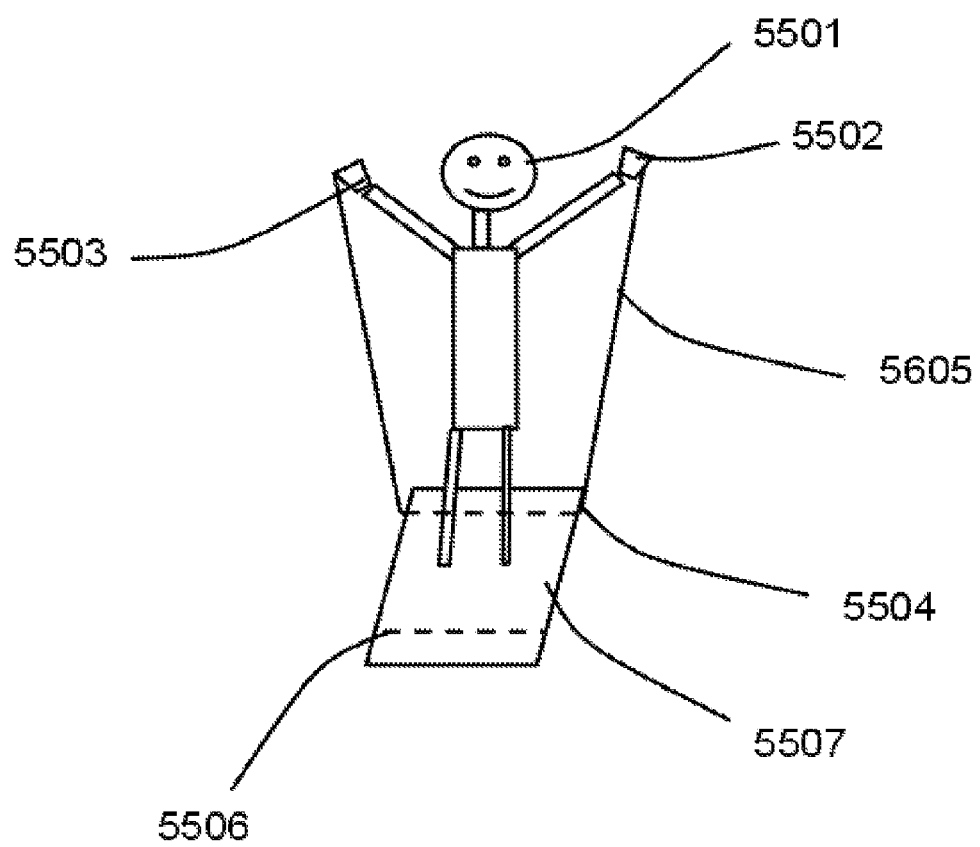
FIG. 55 shows muscle training apparatus implemented as field upgrade to Nintendo WII balance board.
Figure 56:
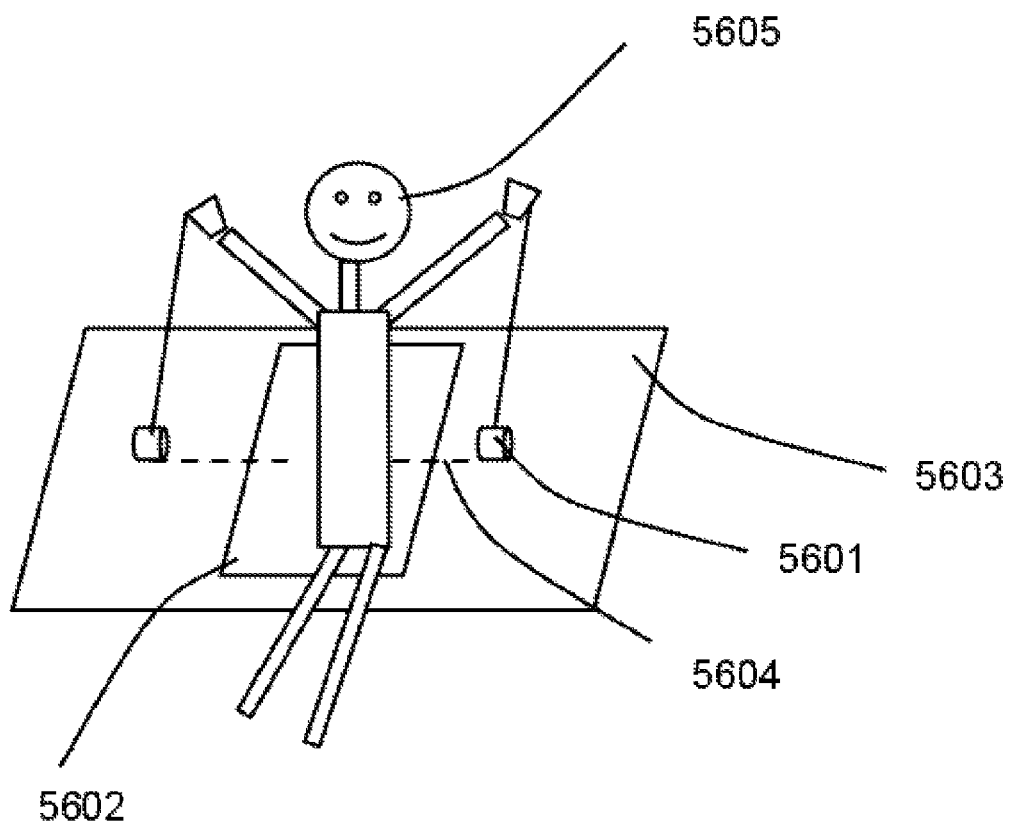
FIG. 56 shows muscle training apparatus implemented as a field upgrade to Nintendo WII balance board.
Figure 57:
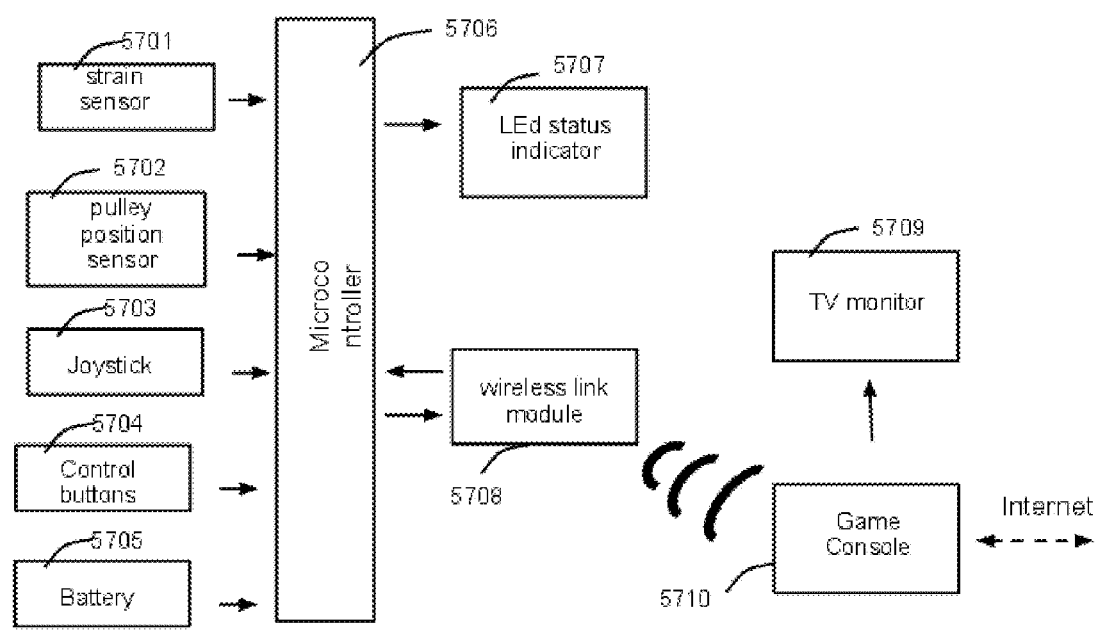
FIG. 57 shows an exemplary block diagram of the handle (see FIG. 50) electronic module.
Figure 58:
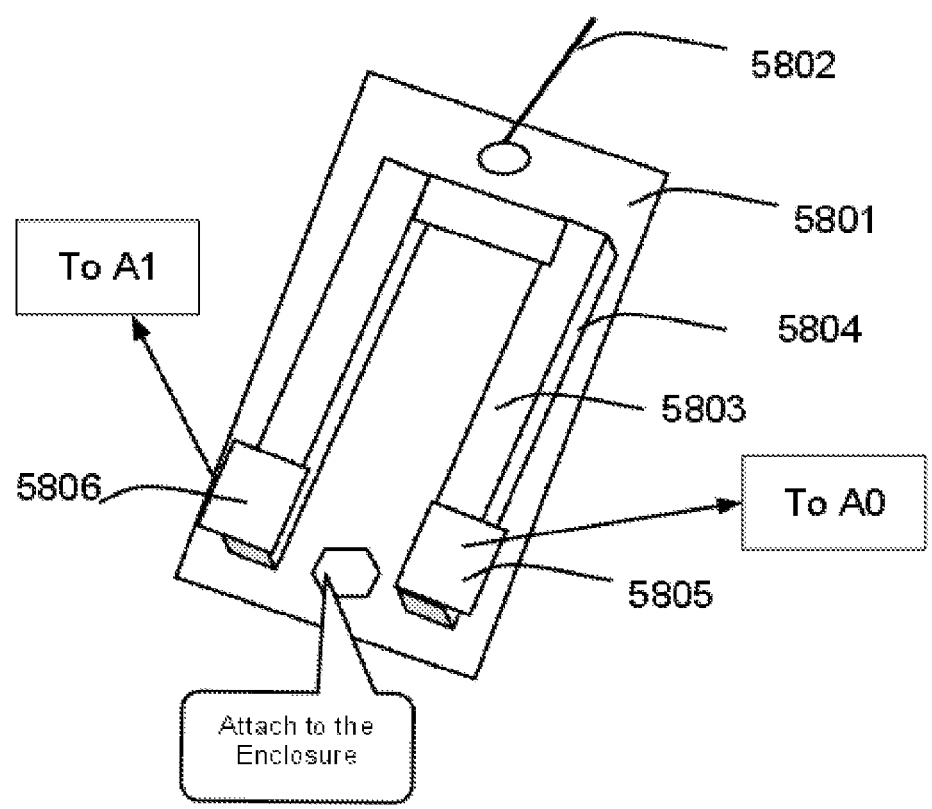
FIG. 58 shows strain sensor.
Figure 59:
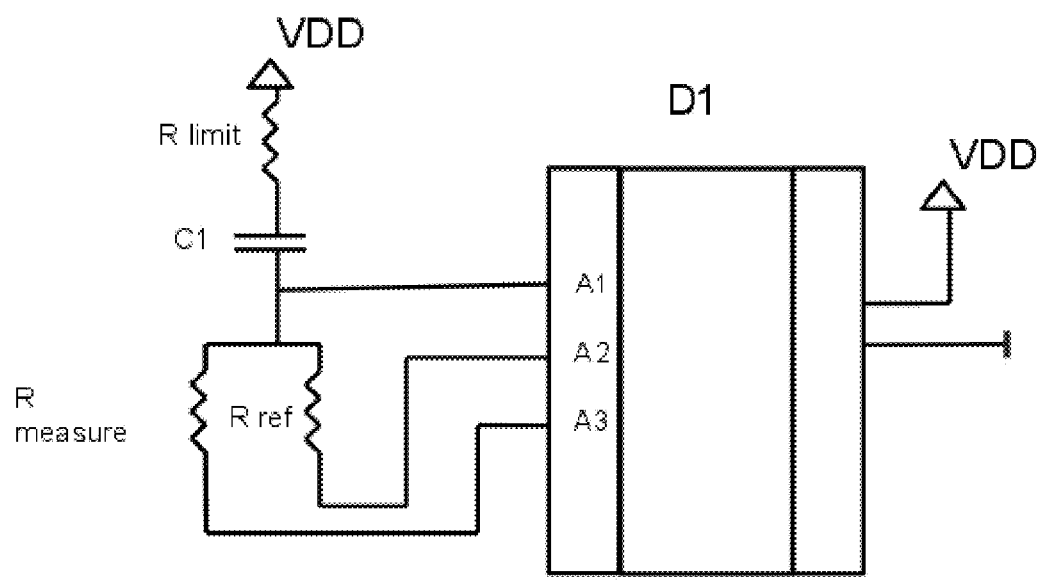
FIG. 59 shows connections of the strain sensor to MCU.
Figure 60:
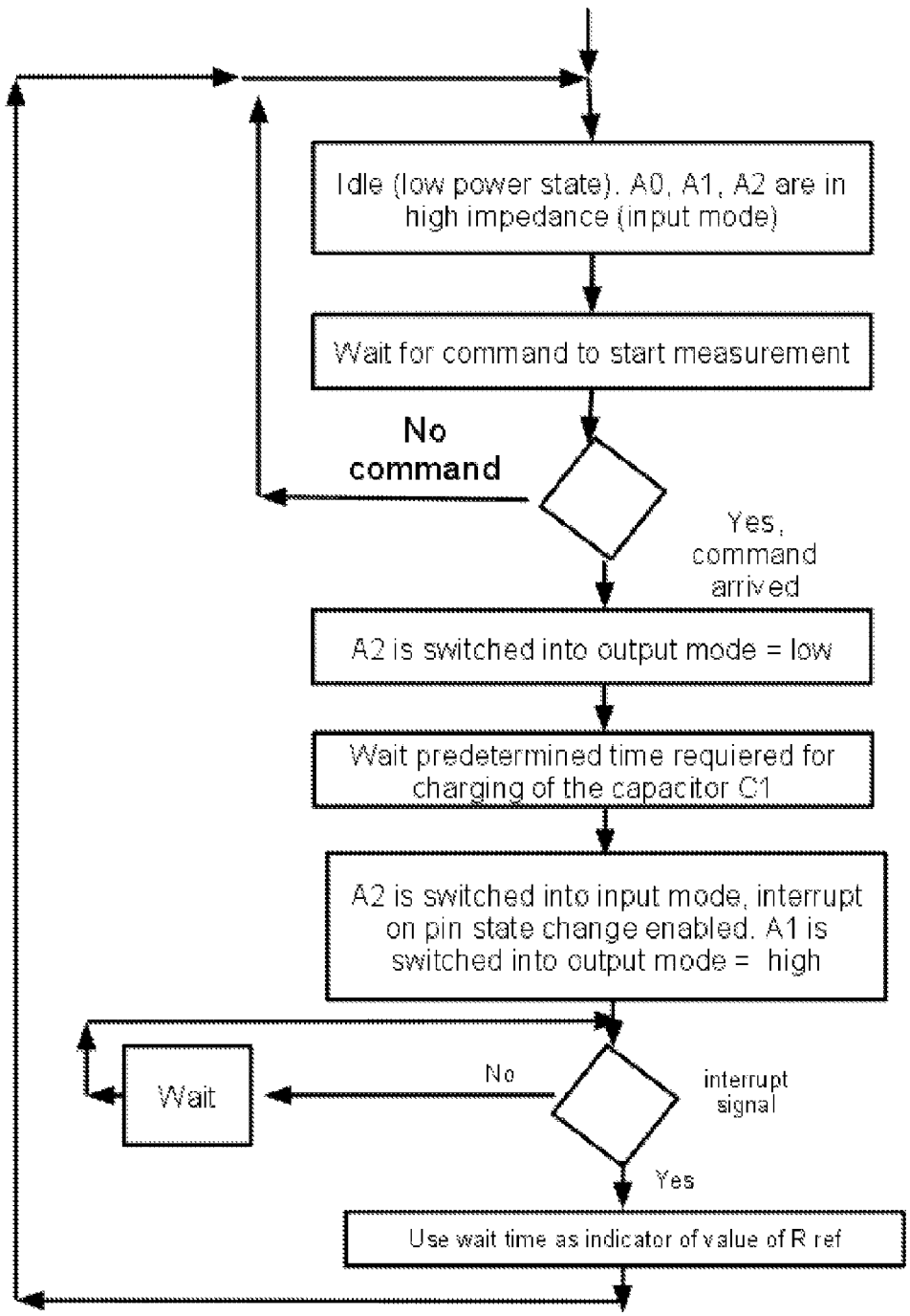
FIG. 60 shows the flow chart of an exemplary algorithm to measure the strain.
Figure 61:
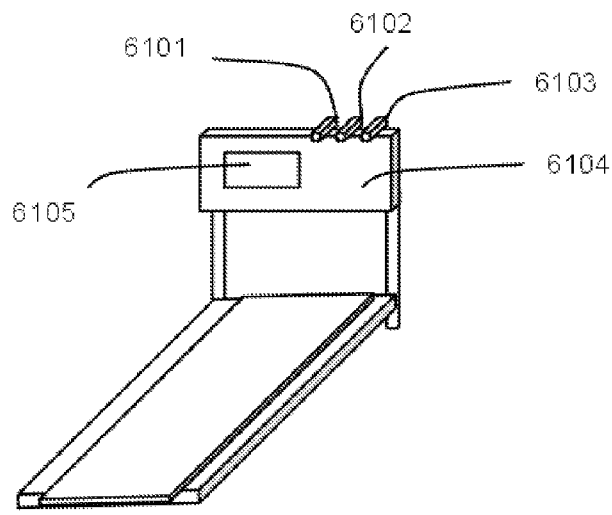
FIG. 61 shows a treadmill equipped with a video camera.
Figure 62:
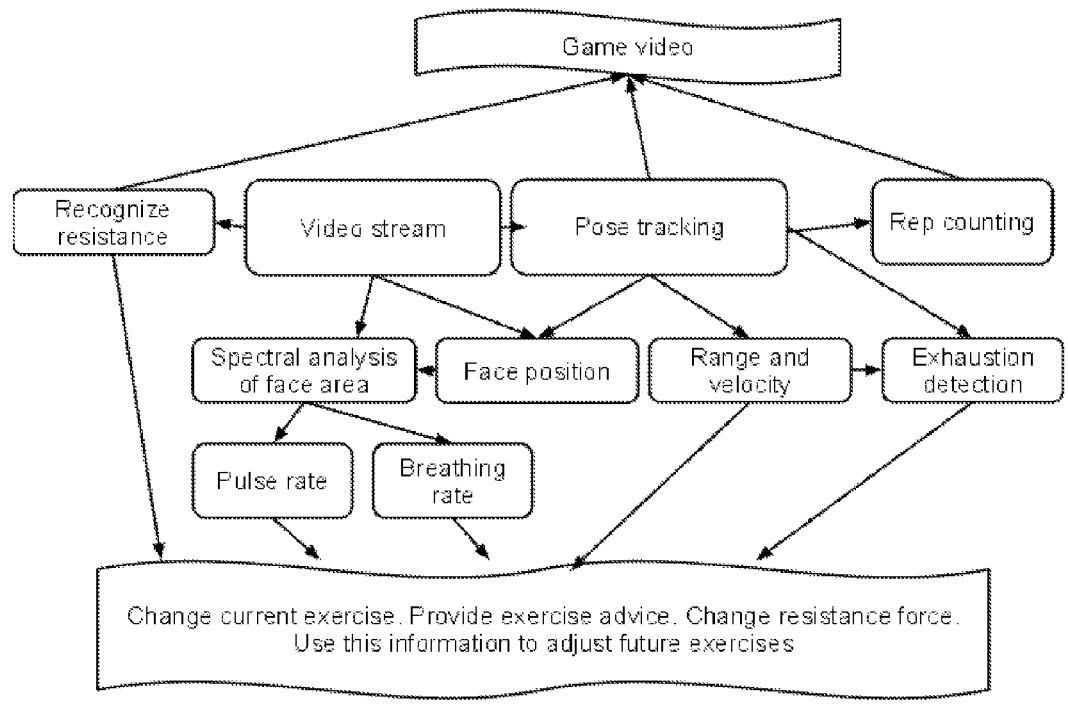
FIG. 62 shows a data flow to use information from video camera.

FIG. 49 depicts overall view and FIGS. 47, 48, 50-60 alternative embodiments and implementation details of a strength machine based on a common idea—the resistance force is provided by counteracting of different muscle group. For example, on FIG. 55 user 5501 pulls up both handles 5502 and 5503. The handles connected by cord 5505. The cord goes through two blocks (pulleys) that are located in extension legs underneath WIT balance board. When user moves one handle upward, another handle is moved up, n allowing for eccentric and concentric motions. The handles have 3d accelerometers and can transfer information used to trace their position to WII console. The tension in the cord creates extra force at the legs, which is measured by WII balance board build in scales and transferred to WII console. The gaming software on WII console receives the pressure at each of the four legs and use it to calculate the resistance force used during exercise.

In the simplest form, the pulley based strength staining machine can be implemented as an electronic-less upgrade to Wii Balance board. Such a product would contain 2 handles connected with a rope of adjustable length, one of the handles would have a pocket to insert WII remote, and 2 leg extensions—2 with blocks, 2 without blocks.

A lot of other different pulley based machines coupled with a video gaming system are in the scope of invention. Some configurations are shown on FIGS. 47, 48, 50-60.

The invention can advantageously monitor the user pulse rate and advantageously use the pulse rate information to adjust the exercise parameters. For example, if pulse rate is too high, the invention can advantageously suggest to use slower motion or reduce the resistance or exercise duration, or number of repetitions and/or sets. If the pulse rate is too high, the invention will advantageously increase the exercise demand. The invention will advantageously store user pulse rate for various exercises and use this information to optimize parameters for future exercises.

Many possible pulse measurement techniques can be used in the invention. In some embodiments, traditional electric contact based heart sensors are used, as shown on FIG. 8, 801.

However, the invention advantageously envisions the use of noncontact heart and breath monitoring techniques in exercise machines. Some of the methods for noncontact measurements of heart and breath rate include laser Doppler (S. Ulyanov and V. Tuchin, "*Pulse-wave monitoring by means of focused laser beams scattered by skin surface and membranes*," in Proc. SPIE, Los Angeles, Calif., 1984, pp. 160-167), microwave Doppler radar (E. Greneker, "*Radar sensing of heartbeat and respiration at a distance with applications of the technology*," in Proc. Conf. RADAR, Edinburgh, U.K., 1997, pp. 150-154) and thermal imaging (M. Garbey, N. Sun, A. Merla, and I. Pavlidis, "*Contact-free measurement of cardiac pulse based on the analysis of thermal imagery*," IEEE Trans. Biomed. Eng., vol. 54, no. 8, pp. 1418-1426, August 2007). Although use of all the methods above are within the scope of invention, in the preferred embodiment the invention uses ordinary Web camera coupled with video gaming system, ordinary web camera installed on a treadmill or other specialized exercise device, the phone camera, or camera build in the Kinect or similar peripheral. The same camera is preferably used for motion and pose tracking. It is know in the art that light reflection properties of human skin changes with blood pulse (see J. Allen, "*Photoplethysmography and its application in clinical physiological measurement*," Physiol. Meas., vol. 28, pp. R1-R39, March 2007). Those slight color changes could be used to detect the pulse and breathing rate (see W. Verkruysse, L. O. Svaasand, and J. S. Nelson, "*Remote plethysmographic imaging using ambient light*," Opt. Expr., vol. 16, pp. 21434-21445, December 2008. and M. Z. Poh, D. J. McDuff, and R. W. Picard, "*Non-contact, automated cardiac pulse measurements using video imaging and blind source separation*," Opt. Expr., vol. 18, pp. 10762-10774, May 2010). All the references are incorporated here within by reference. In the research prototypes developed in the art, OpenCV library is used for face detection, and then blind signal decomposition is used to detect the pulse. Although the same method can be practiced with the invention, another approach would include parametric modelling of skin color changes and detection of the parameter change.

The invention advantageously automatically determines by the processor of a video gaming system the resistance force used during strength training exercise. In one embodiment, the video camera coupled with a video gaming system is used to recognize the weights or adjustable resistance band, or not extended length of resistance band. In other embodiments, the video gaming system receives the resistance directly from the strength machine coupled with a video gaming system. In embodiments, the same video camera is used to recognize the person who is exercising.

In an embodiment, the information of a person exercise history could be used to enable a business transaction with the said person. For example, a person may qualify for a discounted health or life insurance rate in consideration of a regular exercise. In this case the invented software would aggregate the exercise history information and use it as evidence with the insurance provider. Alternatively, the need to exercise may be a safety requirement associated with the job condition, or part of a sentence, or a condition of receiving disability benefits while recovering. The exercise history can be used for grading in the school curriculum. The invention can be used for all those purposes. In an embodiment, the invention use biometric data, such as face or fingerprint recognition to identify the person who exercised. In an embodiment, the invention can use multiple video gaming systems, for example the personal computer equipped with a web camera could be used to monitor in-house exercises, and a smartphone with location identification service, accelerometer, and web camera could be used for outdoor activities. In an embodiment, the system can monitor and facilitate early development activities of child.

The invention claimed is:

1. A method of facilitating strength training exercise by a person using a video gaming system, wherein at least one processor of the video gaming system performs at least the following steps:
   a) communicate a first information with an exercise device, the first information indicative of a resistance force during said strength training exercise,
   b) monitor progress of said strength training exercise,
   c) supply information for a video or an audio signal indicative of the exercise progress;
   wherein said resistance force can be adjusted, so there is a first magnitude of the resistance force associated with a position during exercise movement, and a second magnitude of the resistance force associated with substantially the same position, the first magnitude substantially different from the second magnitude.

2. The method as recited by claim 1, wherein
   the said information is originated by at least one processor of the video gaming system
   the said information is received by said exercise device,
   The said information causing said force adjustment.

3. The method as recited by claim 2, further including the step of communicating a second information, the second information causing a force adjustment substantially different from the one caused by the first information.

4. The method as recited by claim 1, wherein
   a. said information is originated by said exercise device,
   b. said information is received by the video gaming system,
   c. The said information is indicative of the force adjustment.

5. The method as recited by claim 1, wherein said information is a data indicative of a video signal, said video signal originates from a set of at least one video cameras, said processor is coupled with said set, and said exercise device is in a field of view of at least one camera in said set.

6. The method as recited by claim 1, wherein the resistance adjustment can be performed by selecting by said person of an exercise device, and the step a) involves detection of said exercise device.

7. The method as recited by claim 1, wherein the resistance adjustment can be performed by adjusting by said person settings of the exercise device, and the step a) involves detection of said settings.

8. The method as recited by claim 1, further including the following step:
   d) monitor at least one physiological parameter of said person during said exercise.

9. The method as recited by claim 8, further including the following step
   e) use said physiological parameter to generate an audio or a video signal.

10. The method as recited by claim 8, further including the following step:
    f) Use said physiological parameter to generate a force adjustment signal, wherein
       i. said force adjustment signal is originated by the video gaming system,
       ii. said force adjustment signal is received by said exercise device.

11. The method as recited by claim 9, wherein said signal generated in step e) prompts the user to change at least one of the following:

Exercise velocity
Exercise range of motion
Exercise posture
Exercise effort.

12. The method as recited by claim 1, wherein the information is used to change at least one entertaining activity by said person, said entertaining activity performed using the video gaming system.

13. A method of facilitating an exercise by a person using a set of at least one processors, wherein said set performs at least the following steps:
- a. Receives a data derived from a video signal from a video camera, wherein the video contains a skin area of the person,
- b. determines a heart rate of the person using a least a portion corresponding to the skin area of said data,
- c. adjusts a parameter of the exercise depending on said determined heart rate.

14. The method as recited by claim 13, wherein the data are used to track a user's pose.

15. The method as recited by claim 13, wherein the step is done by generating an audio or a video signal facilitating user to change at least one of the following:
Exercise velocity
Exercise range of motion
Exercise posture
Exercise effort.

16. A method of facilitating an exercise by a person using a video gaming system, wherein the video gaming system performs at least the following steps:
- a) Supply a first a video or an audio signal facilitating the person to perform the exercise,
- b) Supply a second video signal facilitating engaging user in an entertainment activity, the entertaining activity is not directly related to or controlled by the said exercise,
- c) Adjust said entertainment activity depending on the exercise, said adjustment is not an on-going control of said entertainment activity.

17. The method as recited by claim 13, wherein step b) is performed using at least a portion of the data corresponding to the visible spectrum.

18. The method as recited by claim 16, wherein said adjustment is an unlocking of some features of the entertaining activity as a result of the exercise activity.

19. The method as recited by claim 18, wherein the unlocking makes the entertaining activity available for an extra time.

20. The method as recited by claim 18, wherein said entertaining activity is a video game and said unlocking is given the person access to a more powerful game artifact.

* * * * *